United States Patent
Kassapoglou

(10) Patent No.: US 6,591,232 B1
(45) Date of Patent: Jul. 8, 2003

(54) METHOD OF SELECTING AN OPTIMUM MIX OF RESOURCES TO MAXIMIZE AN OUTCOME WHILE MINIMIZING RISK

(75) Inventor: Christos Kassapoglou, Stratford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/386,667

(22) Filed: Aug. 31, 1999

Related U.S. Application Data

(60) Provisional application No. 60/138,061, filed on Jun. 8, 1999.

(51) Int. Cl.[7] .............................................. G06F 17/60

(52) U.S. Cl. ...................... 703/2; 705/7; 705/8; 700/96; 700/99

(58) Field of Search .......................... 703/2, 7; 700/95, 700/96, 97, 99; 705/6, 7, 8, 9, 36

(56) References Cited

U.S. PATENT DOCUMENTS

| | | | | |
|---|---|---|---|---|
| 5,408,663 A | * | 4/1995 | Miller | 395/650 |
| 5,930,762 A | * | 7/1999 | Masch | 705/7 |
| 6,198,980 B1 | * | 3/2001 | Costanza | 700/99 |

OTHER PUBLICATIONS

Timothy Gutowski, David Hoult, Greg Dillon, Stuart Muter, Eric Kim, Mawuli Tse, Ein–Teck Neoh, "*Development of a Theoretical Cost Mosel for Advanced Composite Fabrication*", Fourth NASA DoD Advanced Composites Technology Conference, Salt Lake City, UT, pp. 1–28, Jun. 7–11, 1993.

Robert L. Callaway, Robert I. Schmidt, Lawrence R. Weatherford, "*An Algorithm for Maximizing Target Achievement in the Stochastic Knapsack Problem with Normal Returns*", Navel Research Logistics, vol. 40, pp. 161–173 (1993).

Mordechai I. Henig, "*Risk Criteria in a Stochastic Knapsack Problem*", Operations Research vol. 38, No. 5., pp. 820–825 (1990).

Zelda Zabinsky, Mark Tuttle, Douglas Graesser, Ph.D., Gun–In Kim, Ph. D., Darrin Hatcher, Gary Swanson, Larry Ilcewicz, "*Multi–Parameter Optimization Tool For Low–Cost Commercial Fuselage Crowns Designs*" Article, pp. 737–748 (undated).

*National Advanced Composites Strategic Plan*, National Center for Advanced Technologies, Washington, DC, pp. 32–33.(1991).

Stephen L. Metschan, Gerald E. Mabson, Gary D. Swanson, Mark H. Gessel, Robert J. Humphrey, Dave K. Tervo, "*Integration of Advanced Composite Manufacturing Trials into a Design/Cost Database*" Control No. NAS1–18889, NASA Langley Research Center, pp. 1–12 (undated).

(List continued on next page.)

Primary Examiner—Samuel Broda
Assistant Examiner—Thai Phan
(74) Attorney, Agent, or Firm—Bachman & LaPointe, P.C.

(57) ABSTRACT

A method of selecting the optimum mix of resources for achieving an outcome while minimizing risk is presented. In one embodiment, the method is applied to selecting the optimum mix of manufacturing technologies and amount of use of each technology for fabricating a helicopter fuselage structure in order to minimize the recurring cost and keep the risk below a pre-selected value. The method involves selecting a plurality of resources which can be used to achieve the desired outcome. Determining an associated outcome for each resource. Establishing at least one target risk level for the desired outcome. Calculating an associated outcome and risk for a plurality of combinations of the resources at a plurality of percentage applications of each resource. Then determining an optimum mix of resources and percentage of application of each resource which maximizes the outcome while maintaining the risk below the at least one target risk level. The method can also be tailored to provide resource mixes which achieve a desired outcome over time.

23 Claims, 14 Drawing Sheets

Cost savings comparison of two technology mixes with baseline.

OTHER PUBLICATIONS

Harvey M. Salkin, Cornelis A. de Kluyver., "*The Knapsack Problem: A Survey*", Naval Research Logistics Quarterly, vol. 22, 1975, pp. 127–144 (1975).

E. Steinberg, M.S. Parks, "*A Preference Order Dynamic Program for a Knapsack Problem with Stochastic Rewards*", J. Opl Research Society, vol. 30, pp. 141–147 (1979).

S.L. Metschan, D.L. Graesser, G.E. Mabson, M.R. Proctor, D.K. Tervo and L.B. Ilcewicz, "*Manufacturing Data for Costade Analysis of Composite Fuselage Panels*" Control Nos. NAS1–18889 and NAS1–20013, NASA Langley Research Center, 33 pages (undated).

G.E. Mabson, B.W. Flynn, L.B. Ilcewicz, D.L. Graesser, "The Use of Costade in Developing Composite Commercial Aircraft Fuselage Structures," The American Institute of Aeronautics and Astronautics, Inc., pp. 1384–1393 (1994).

F.W. Scholz, M.A. Stephens, "*K–Sample Anderson–Darling Tests,*" Journal of the American Statistical Association, vol. 82, No. 399, Theory and Methods, Sep.,1987.

Harvey M. Wagner, "*Stagecoach Problem,*" Principles of Operations Research With Applications to Managerial Decisions, pp. 265–269, (undated).

* cited by examiner

Cost savings and variance of savings for two-technologies case (case 1)

Cost savings variance for two technology case (case 1)

Cost savings for the case of two technologies (case 1)

Cost savings variance for two-technology case (case 2)

Cost savings variance for two-technology case (case 3)

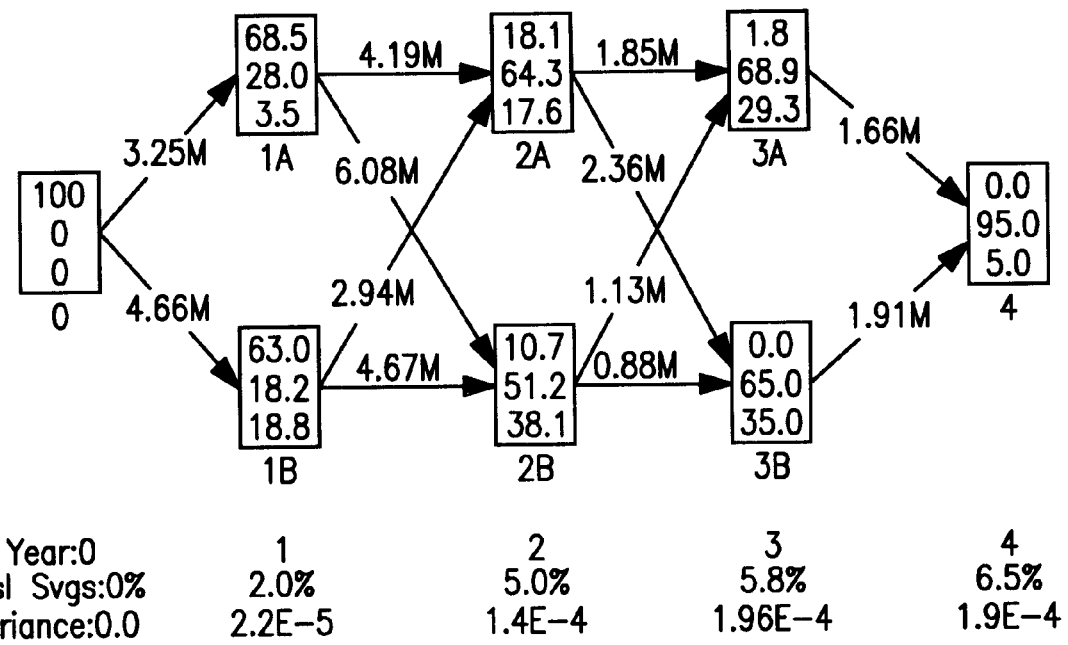
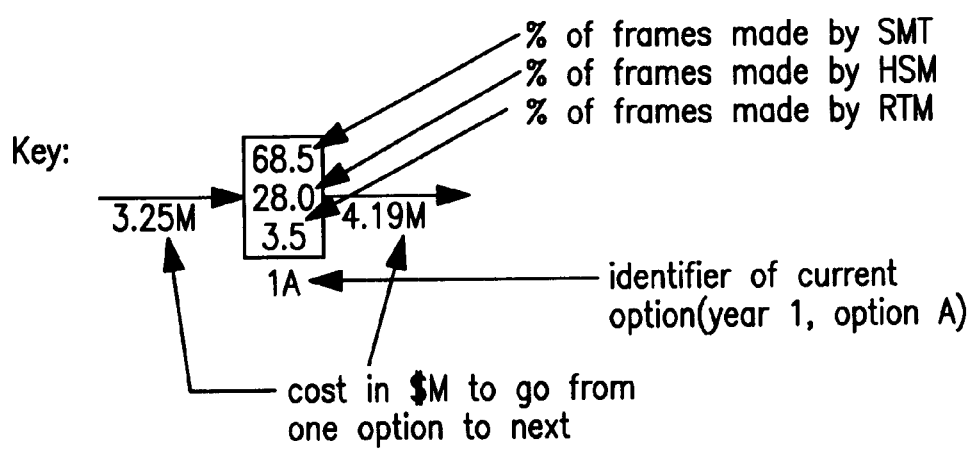
Example of technology implementation as a function of time
FIG. 8

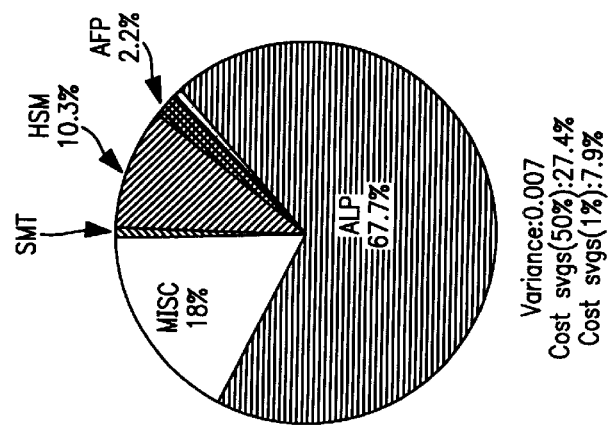
FIG. 15c — High risk
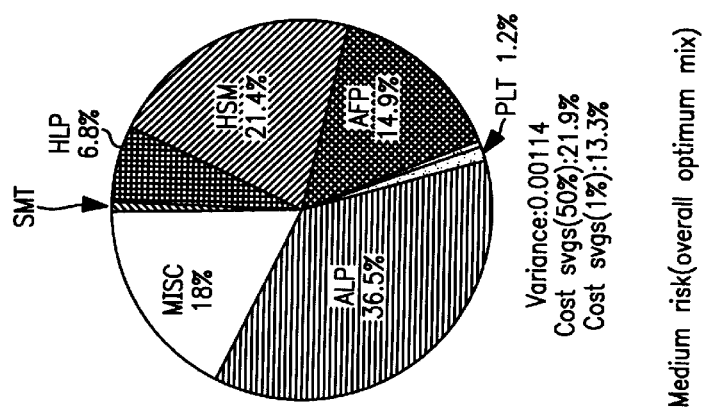
FIG. 15b — Medium risk (overall optimum mix)
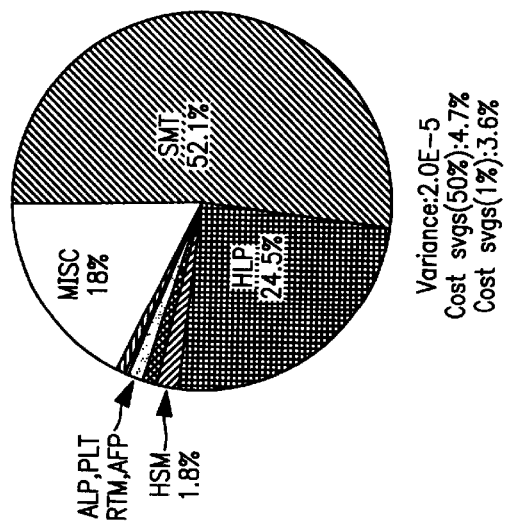
FIG. 15a — Low risk

METHOD OF SELECTING AN OPTIMUM MIX OF RESOURCES TO MAXIMIZE AN OUTCOME WHILE MINIMIZING RISK

RELATED APPLICATION

This application is related to and claims priority from U.S. Provisional Application Ser. No. 60/38,061 filed Jun. 8, 1999.

BACKGROUND AND SUMMARY OF THE INVENTION

In current day society, there is usually more than one way to achieve an end result and, in many cases, a combination of ways to do so. Each way of achieving the end result has an associated amount of cost and risk.

For example, Any new aircraft program or any major modification program of an existing product is faced with the following important question: Which technology or combination of technologies (technology mix) should be used to meet the mission requirements at the lowest possible cost and risk? This question can be posed with any product focus in mind such as avionics and controls, structures, propulsion, etc.

The emergence of a great variety of manufacturing technologies over the last two decades has made finding the answer to the above question very complicated. Examples of these candidate technologies are high speed machining, resin transfer molding, automated fiber placement, pultrusion, automated tape layup, etc. In addition, the traditional technologies of sheet metal construction and composite hand layup are also viable candidates for many applications. Many of these technologies compete with each other for the same type of part and are expected to perform differently (in terms of component cost) depending on their respective level of maturity, production readiness, applicability, mission requirements, etc. Recent work by Metschan, S. L., Graesser, D. L., Mabson, G. E., Proctor, M. R., Tervo, D. K., and Ilcewicz, L. B., "*Manufacturing Data for COSTADE Analysis of Composite Fuselage Panels*", *Fifth NASA Advanced Composites Technology Conference,* Seattle, Wash., pp. 93–126, Aug. 22–25, 1994;, and Mabson, G. E., Flyn, B. W., Ilcewicz, L. B., and Graesser, D. L., "*The Use of COSTADE in Developing Commercial Aircraft Fuselage Structures*", *Proceedings of 35th AIAA/ASME/ASCE/AHS/ASC SDM Conference,* Hilton Head, S.C., Apr. 18–24, 1994, which are incorporated herein by reference in their entirety, discuss the progress that has been made in including cost early in trade studies and linking the design process to optimizing software that, for a given technology, will determine the lowest cost and/or weight configuration. However, this work stops short of simultaneously trading multiple technologies over multiple families and accounting for the risk associated with the use of each candidate technology.

Selecting which technologies should be used, and to what extent, is traditionally based on previous experience with some of the technologies and a perception of the risk associated with applying these technologies. Risk is related to the degree of confidence of how consistently a technology will meet or exceed the cost goals of the program. A more accurate definition of risk for the purposes of this investigation will be given later. In what follows the term technology refers to a combination of manufacturing technology, material, and design concept.

Both previous experience and the subjective perception of risk tend to limit the options and significantly decrease the potential cost improvements that would be realized when a technology mix is implemented. An approach is needed that can quantify the cost associated with technologies even where little or no experience is available. This approach should also include a more accurate assessment of risk that is independent of subjective evaluations as much as possible. Finally, the approach should provide a means of selecting the optimum technology mix for an application.

SUMMARY OF THE INVENTION

The present invention presents the formulation for such an approach that will minimize the (recurring) cost associated with fabricating entire fuselages or significant portions thereof at a predetermined risk level. It is based on developing estimates of the cost variation of each candidate technology around its expected (mean) value that account for the production-readiness level of each technology. This variation is directly related to the uncertainty associated with choosing one technology over another or applying a combination of technologies at different parts of the structure in question. A portfolio optimization problem is then formulated and an algorithm proposed for selecting the technology mix that gives the lowest recurring cost given a pre-selected uncertainty level. By varying the uncertainty level, different optimum technology mixes can be obtained. From these the one that maximizes the cost savings with a low probability (e.g., 1%) of lower savings is selected as the overall optimum technology mix.

The incorporation of the cost as an objective function to be minimized during the design process has led to design configurations where the mission requirements (loads, stiffness, etc.) are met and at the same time the cost and/or weight are minimized. See, Zabinsky, Z. B, Tuttle, M. E., Graesser, D. L., Kim., G. I., Hatcher, D., Swanson, G. D., Ilcewicz, L. B., "*Multi-Parameter Optimization Tool for Low-Cost Commercial Fuselage Crown Designs*", *First NASA Advanced Composite Technology Conference,* NASA-CP-3104, Seattle, Wash., pp. 737–748, Oct. 29–Nov. 1, 1990; Metschan, S. L., Mabson, G. E., Swanson, G. D., Gessel, M. H., Humphrey, R. J., and Tervo, D. K., "*Integration of Advanced Composite Manufacturing Trials into a Design/Cost Database*", *Fourth NASA Advanced Composite Technology Conference,* Salt Lake City, Utah, Jun. 7–11, 1993; Metschan et al., "*Manufacturing Data for COSTADE Analysis of Composite Fuselage Panels*", supra; and Mabson et al.,"*The Use of COSTADE in Developing Commercial Aircraft Fuselage Structures*", supra. However, in these and other similar studies, the optimization was limited to determining the geometry that would minimize the cost or weight once the manufacturing process, material, and design concept were selected. A vital step preceding this step is the selection of the technologies to be used and their corresponding percentages of application on a vehicle such as the fuselage of an aircraft.

Once the most promising technologies are selected from a list of candidate technologies, and their corresponding levels of application are determined so that cost and risk are minimized, detailed optimization on the component level, accounting for the actual applied loads, can be done using the approaches presented in prior art literature. However, the first step of optimum technology selection will improve the results significantly as the selection of technologies will not only rely on experience or company preferences but also on an optimization approach that will pinpoint which technologies and to what extent those technologies should be used for a particular application. The selection of the optimum technology mix not only helps steer research programs and technology investments, but also provides a reliable guideline of what level of cost will be incurred during production and what the associated risk will be.

While the examples provided herein focus on the optimum mix of manufacturing technologies for fabricating a fuselage structure of a helicopter, it is contemplated that the present invention and the teachings provided herein are directly applicable to other disciplines. For example, the present invention can be used for (1) selecting the appropriate mix of aircraft for attacking a particular target while minimizing aircraft losses; (2) selecting a mix of investments to achieve a desired return while minimizing cost and risk; or (3) selecting an appropriate series of directions for getting to a destination while minimizing expenses and time. These are just a few of the many distinct applications that the present invention can be applied to. Those skilled in the art of operational research would readily be able to apply the teachings herein to any of these or other applications.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 8 is an exemplary illustration of technology implementation over time.

FIGS. 15a–15c illustrate resource mixes for different levels of risk.

FORMULATION OF THE PROBLEM

Figure 1:
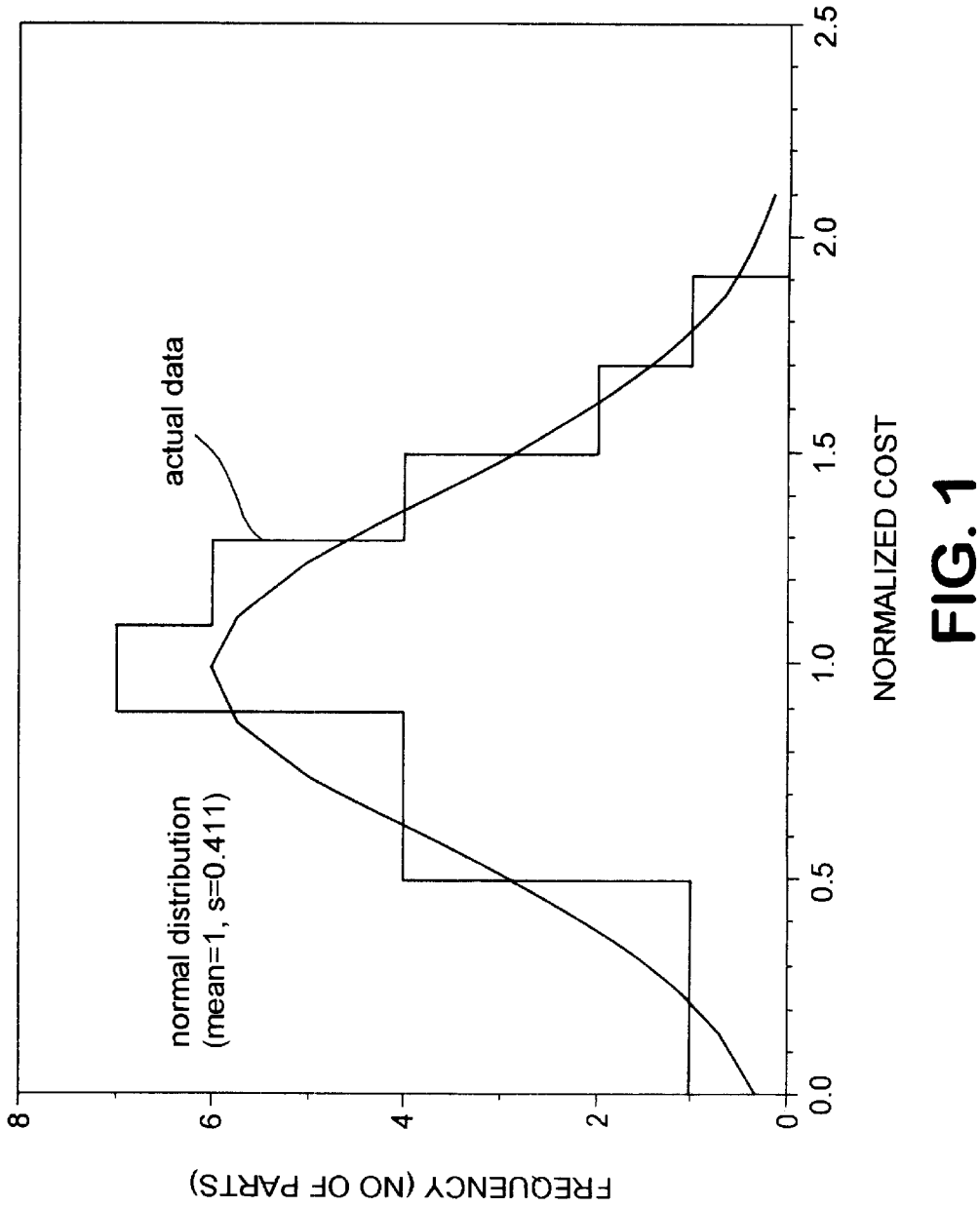
FIG. 1 is an exemplary distribution curve of the normalized cost for fabricating skins and covers made by hand layup including complexity and uncertainty.

The recurring cost (in terms of labor hours) to fabricate and assemble a part depends, to a large extent, on the following four factors:

(1) Part size. Larger parts of the exact same geometry (scaled-up) will cost more than smaller parts.

(2) Part complexity. The higher the part complexity, even for parts of the same size (weight), the higher the cost will be. Part complexity can be defined in many ways depending on the degree of rigor required. In the case of hand laid-up composite structures, Gutowski, T., Hoult, D., Dillon, G., Neoh, E., Muter, S., Kim, E., and Tse, M., "*Development of a Theoretical Cost Model for Advanced Composites Fabrication*", Composites Manufacturing, Vol. 5, No. 4, pp. 231–239 (1994), which is incorporated herein by reference in its entirety, defines complexity as a measure of the information content of the part to be fabricated. The article also developed ways to quantify its effect on part cost. A simple way to view complexity is as a measure of geometry changes within a part and a measure of the quantity of local or isolated details incorporated in the part. For example, single curvature unstiffened skin panels will have lower complexity than double curvature skin panels with integral stiffeners of the same size. The cost will correspondingly be higher for the more complex parts. Variations in complexity among part families (discussed below) are taken into account by determining different statistical distributions for each fabrication process/part family combination. For example, curved skins made by filament winding have lower part complexity (e.g., are easier to make) than curved skins made by hand layup. This is reflected in the mean and variance of the corresponding cost distributions.

(3) Process or operator variability. The same part made to the same specifications with the same equipment will have different cost. This is particularly evident in touch-labor-intensive fabrication processes such as hand layup of composites where different operators exhibit different levels of efficiency in doing the same operation. e.g., laying down and compacting a ply of prepreg into a tool with a radius. For automated processes this type of variability is significantly smaller. The equipment used (e.g., cutting or layup machines) will have the same throughput for the same type of part and will use the same software to define the task to be done. The only differences will occur during loading and unloading the machine or machine down times for repairs and maintenance.

(4) Process/material/design concept compatibility and technology production readiness. When a new design concept is combined with a new material and a new fabrication process to make a part, the cost will be higher than if a more traditional approach were used. This is not just the result of the learning curve effects, which is excluded here. It is related to the fact that some process/material/design concepts simply do not consistently meet the cost targets and show a large variability around the mean. This is due to the fact that the combination selected may never overcome inherent problems, such as problems that result. from requiring tolerances that. are at the limits of what the process selected can deliver for the part. For example, it is possible to pultrude skins, but the cost and quality of the resulting parts will be unacceptable if the part width is beyond a certain value. This does not preclude the use of the process as improvements in the future overcome the current problem and make the combination more cost-competitive. In fact, this expectation that a given technology will improve can be incorporated in the present invention as will be discussed below.

In what follows, the cost will be normalized by the weight of the part (hrs/kg or hrs/lb). This will account, to a large extent, for the dependence of cost on weight or size. The fact that different processes may produce lighter parts should also be accounted for by performing a weight optimization or a combined cost and weight optimization. This is not done in the following analysis since the focus is the recurring cost of the parts.

The remaining factors that affect the cost are split in two categories. The first category includes the complexity factor. The second category includes production-readiness and operator/equipment variability. This second category or set of factors will be referred to as uncertainty factors.

The fuselage of an aircraft can be divided into part families. A part family is defined as a set of substantially similar parts. This means that when fabricated with a certain technology, the cost, normalized by weight, will depend mostly on complexity level and the cost uncertainties mentioned earlier. This division in part families is mainly a matter of convenience to make the problem more tractable.

The families selected in this study are shown in Table 1. The families cover the entire fuselage. The parts in each family exhibit certain characteristics in common. For example, skins and covers are parts with curvature but without reinforcements or angles present. Frames and bulkheads are flat parts with reinforcements or angles (caps, stiffeners, hole reinforcements). Stringers are long straight parts with substantially constant cross section. Fittings are small three dimensional parts. Decks and floors are flat parts without reinforcements or angles. Doors and fairings are parts with complex curvature and reinforcements. These are examples that have been selected for the following discussion. It should be recognized that the parts in each family and the families themselves are in no way limited to these recited examples.

TABLE 1

Part Families For Aircraft Fuselage

| Part Family No. | Description |
| --- | --- |
| 1 | Skins and Covers |
| 2 | Frames, Bulkheads, Beams, Longerons, Spars, Ribs, Intercostals |
| 3 | Stringers |
| 4 | Fittings |
| 5 | Decks and Floors |
| 6 | Doors and Fairings |
| 7 | Miscellaneous: Seals, Transparencies, etc. |

The dependence of the cost on complexity and uncertainty factors is shown in FIG. 1 for one part family, skins and covers made by one fabrication process, composite hand layup. The actual data represent 3 1 different parts in this part family. They were all made for the Sikorsky Advanced Composite Airfarme Program in the early 80's. Individual data are shown in Table 2. The cost of these parts (in hrs/kgr) was divided by the average cost of 8.73 hrs/kgr so that all the data are normalized with a mean value of 1. The data were found to follow a normal distribution using the Anderson-Darling test for normality discussed in Scholz, F. W., and Stephens, M. A., "K-Sample Anderson-Darling Tests of Fit", Journal of American Statistical Association, Vol. 82, pp 918–924 (1987), which is incorporated herein by reference in its entirety. The observed significance level was 0.658 (any value higher than 0.05 suggests that the data can be represented by a normal distribution). The standard deviation of the normalized data was found to be 0.41 1. The corresponding probability density curve for a normal distribution with mean 1 and standard deviation 0.41 1 is also shown in FIG. 1. In what follows, the cost distribution will always be assumed to follow a normal distribution (supported by similar data for other part families and fabrication processes). Of course, there is no need for the data to follow a normal distribution in order to use the present invention. Other types of statistical distributions can be used. The basic approach and the conclusions, in terms of relative position of various technology mixes, will not change.

The cost data FIG. 1 and Table 2 include the effects of (a) part complexity, and (b) uncertainty due to operator variability and technology-readiness. The distribution without the effects of uncertainty is compared to the data in FIG. 2.

TABLE 2

Hand Laid-up Skins and Covers

| Part No | Cost Normalized by weight & divided by mean cost |
| --- | --- |
| 1 | 1.64 |
| 2 | 1.36 |
| 3 | 1.44 |
| 4 | 1.05 |
| 5 | 1.06 |
| 6 | 0.55 |
| 7 | 0.55 |
| 8 | 1.43 |
| 9 | 0.04 |
| 10 | 0.40 |
| 11 | 1.18 |
| 12 | 1.15 |
| 13 | 0.16 |
| 14 | 0.91 |
| 15 | 0.70 |
| 16 | 1.25 |
| 17 | 0.72 |
| 18 | 1.06 |
| 19 | 1.06 |
| 20 | 0.94 |
| 21 | 0.95 |
| 22 | 1.26 |
| 23 | 1.22 |
| 24 | 0.64 |
| 25 | 0.67 |
| 26 | 0.83 |
| 27 | 0.87 |
| 28 | 1.53 |
| 29 | 1.18 |
| 30 | 1.45 |
| 31 | 1.73 |

The effects of uncertainty were estimated as follows: First, it was assumed that the coefficient of variation of the cost distribution is made up of the individual coefficients of variation due to complexity and uncertainty:

$$CV_{tot} = CV_c + CV_u \qquad (1)$$

where the subscripts refer to "total", "complexity" and "uncertainty" respectively.

Equation (1) implies that if there were no uncertainty due to technology readiness or operator variability, the variability of the cost distribution data would only represent the effect of part complexity. Or, if only parts of the same complexity were included in the data, the variability exhibited by the results would only represent the effect of uncertainty due to technology readiness and operator variability.

It is next assumed that. for a sufficiently large data sample, the mean cost will be independent of complexity or uncertainty. It will only depend on the part size. Then, by using the fact that the coefficient of variation is equal to the standard deviation divided by the mean, and since the mean $\mu$ for the three populations (total cost, cost due to complexity, and cost due to uncertainty) is the same, equation (1) is rewritten as:

$$\frac{\sigma_{tot}}{\mu} = \frac{\sigma_c}{\mu} + \frac{\sigma_u}{\mu} \quad (2)$$

where σ denotes the standard deviation and the subscripts are as for equation (1).

The problem is, therefore, reduced to calculating the standard deviation $\sigma_c$ due to complexity. Then, knowing the standard deviation $\sigma_{tot}$ for the population when complexity and uncertainty are included, the standard deviation $\sigma_u$ describing uncertainty can be determined from equation (2).

The standard deviation of the cost distribution due to complexity alone was determined by selecting a sample of the original data that covered the entire complexity range and had negligible uncertainty effect. This was done by selecting pairs of mirror image parts (corresponding to the left and right hand side, or top and bottom of the fuselage) which were manufactured at the same time (no learning curve effects) and showed very nearly the same cost for the members of the pair. If the cost were significantly different for the two members, it would be due to operator variability. The reduced set of data contained 20 parts out of the original 31 and is shown in Table 3. The data in Table 3 are obtained by dividing the part cost (hrs/kgr) by the mean of this reduced set. Thus, the means in both Tables 2 and 3 are equal to 1 and there will be a small difference between corresponding entries in the two tables.

It should be noted that the mean of the reduced set in Table 3 before normalization is 8.92 hrs/kgr which is within 2% of the mean value of 8.73 (Table 2) of the entire population when both complexity and uncertainty are included. This verifies the assumption that the mean for the individual cost data populations is constant.

The standard deviation of the (normalized) data in Table 3 is 0.317. Then, from equation (2) and using the fact that $\sigma_{tot}/\mu=0.411$, the standard deviation of the cost due to uncertainty is found to be 0.094.

Figure 2:
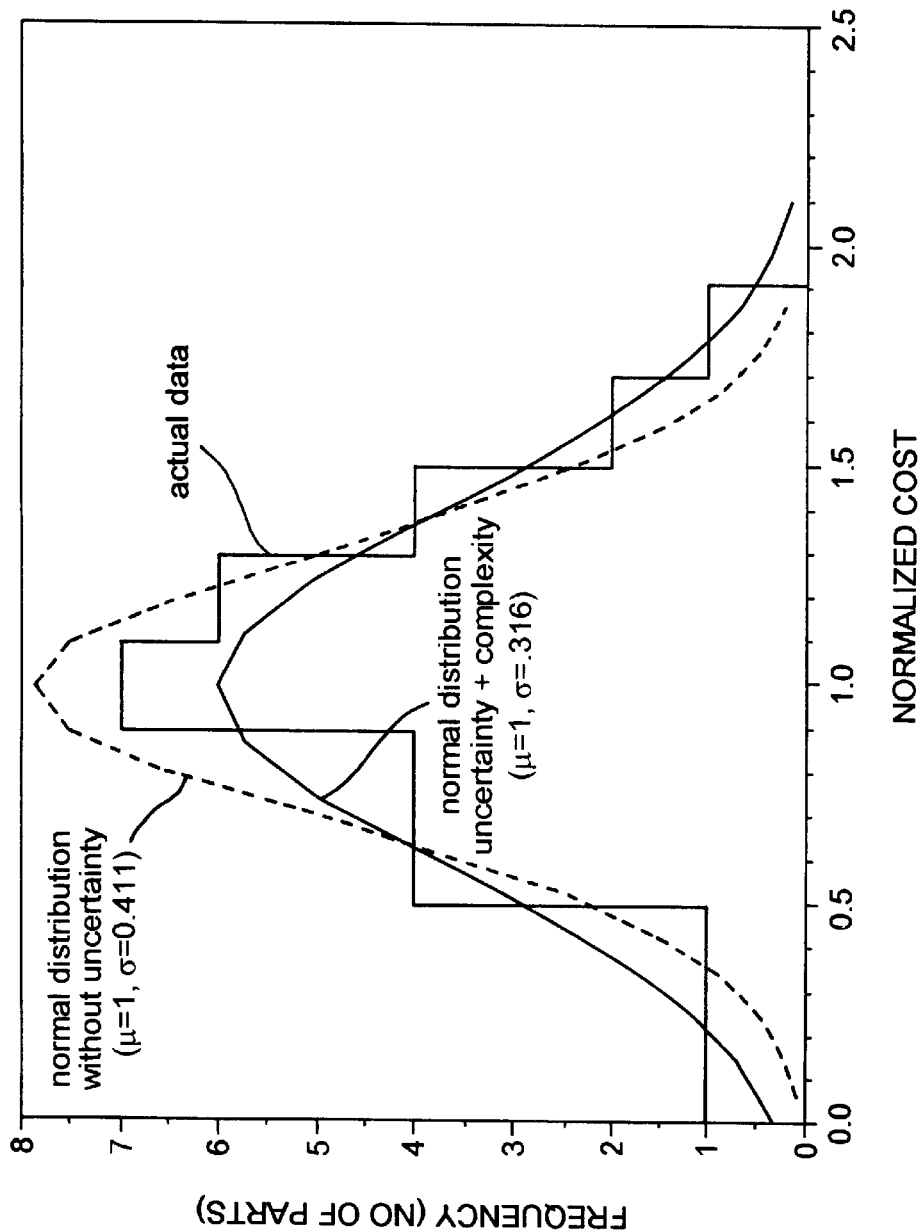
FIG. 2 are two exemplary distribution curves of the normalized cost for fabricating skins and covers made by hand layup, one curve including uncertainty, the other not.

The dashed line in FIG. 2 shows what the cost variation would be if there were no uncertainty due to technology readiness, or operator variability. That is, if a process is mature, streamlined, optimized, and automated so that the uncertainty due to operator variability or the process not being production-ready is negligible, the cost of the entire part family will be represented by the narrower dashed curve in FIG. 2. In the current example of hand laid-up skins, the manufacturing technology has been in production for at least two decades. So it is mature and the uncertainty is only due to operator variability. Even this uncertainty (standard deviation of 0.094) is small. This is why the two cost distributions in FIG. 2 are relatively close to each other.

TABLE 3

Hand Laid-up Skins and Covers
Cost of Parts with Different Complexity

| Pair of Parts (part Nos. in Table 2) | Cost normalized by weight and divided by mean cost |
|---|---|
| 1 (6,7) | 0.54 |
|  | 0.54 |
| 2 (11,12) | 1.16 |
|  | 1.12 |
| 3 (14,15) | 0.89 |
|  | 0.68 |

TABLE 3-continued

Hand Laid-up Skins and Covers
Cost of Parts with Different Complexity

| Pair of Parts (part Nos. in Table 2) | Cost normalized by weight and divided by mean cost |
|---|---|
| 4 (18,19) | 1.04 |
|  | 1.14 |
| 5 (20,21) | 0.92 |
|  | 0.93 |
| 6 (22,23) | 1.23 |
|  | 1.20 |
| 7 (24,25) | 0.62 |
|  | 0.66 |
| 8 (26,27) | 0.81 |
|  | 0.86 |
| 9 (28,29) | 1.49 |
|  | 1.15 |
| 10 (30,31) | 1.42 |
|  | 1.69 |

One can envision numerous situations where the technologies considered are not as mature as the example used here. Either because the technologies have not yet been scaled-up from laboratory to production or because they are new for the organization planning to use them. Such technologies could be automated fiber placement or robotics layup of composites and high speed machining of metals. As a result, the expected cost distribution with complexity and uncertainty effects included could be very wide and dominated by the uncertainty effects. These uncertainty effects would result in high repair costs or scrap rates at the beginning. Of course, as time goes by and the technologies mature and the designs are improved to meet the process capabilities, this uncertainty will decrease significantly. This brings a time element into the analysis. What is of interest here is how the technologies will perform from the first day of application and not after a few years where learning curve effects, technology and design improvements reduce the cost. In certain applications, such as aerospace applications, part volume is not sufficient to rely on learning curve effects to bring the cost down significantly.

As more data become available, technologies reach maturity and designs become more cost effective, the procedure discussed below can be repeated with updated input to create updated technology mixes. This then leads to a strategic time-dependent plan that will change with time to yield the optimum results.

The sought-for quantity is now starting to become evident. It is the cost variability due to uncertainties caused by low levels of production readiness and operator or equipment variability. If this uncertainty is minimized, the cost distribution becomes tighter. Thus, the risk of a program having cost overruns or not meeting targets is minimized. Risk can be defined as a measure of how wide the cost distribution due to uncertainty is. More particularly, the associated risk can be defined as the variance (i.e., the square of standard deviation) of the cost due to uncertainty.

As discussed above, the strategy of a new or major redesign program is generally to select the technologies or combination of technologies that minimize the mean cost and keep the variance of the expected cost (the risk) as low as possible. When the variance is minimized, the cost (in hrs/kg) is almost entirely dependent on part complexity. To the extent that accurate cost estimating tools (based on experience, parametric studies, detailed models of the processes) are available, the cost will be known accurately and no surprises should be expected.

In order to simplify the presentation of results, the discussion will reference the expected cost to a baseline cost. The baseline cost can be the actual cost of an existing (similar) fuselage that will be modified, or a fictitious/target cost based on market considerations, similarity with other programs and historical data. Then, by subtracting the expected cost from the baseline cost, a population of cost savings is created. This population will be assumed to be normally distributed and will be characterized by a mean and a variance value. If the mean is negative (negative savings) the expected cost is higher than the baseline cost.

The assumption that the cost savings population is normally distributed is reasonable if the expected cost population is normally distributed. The reason is that the baseline typically represents historical cost data with existing production-ready processes that are well understood and have negligible variation due to uncertainty around the mean (the effect of complexity will always be there). This means that, in effect, the cost savings is created by subtracting a normal distribution from a scalar (the baseline cost value) and is thus itself normally distributed.

Figure 3:
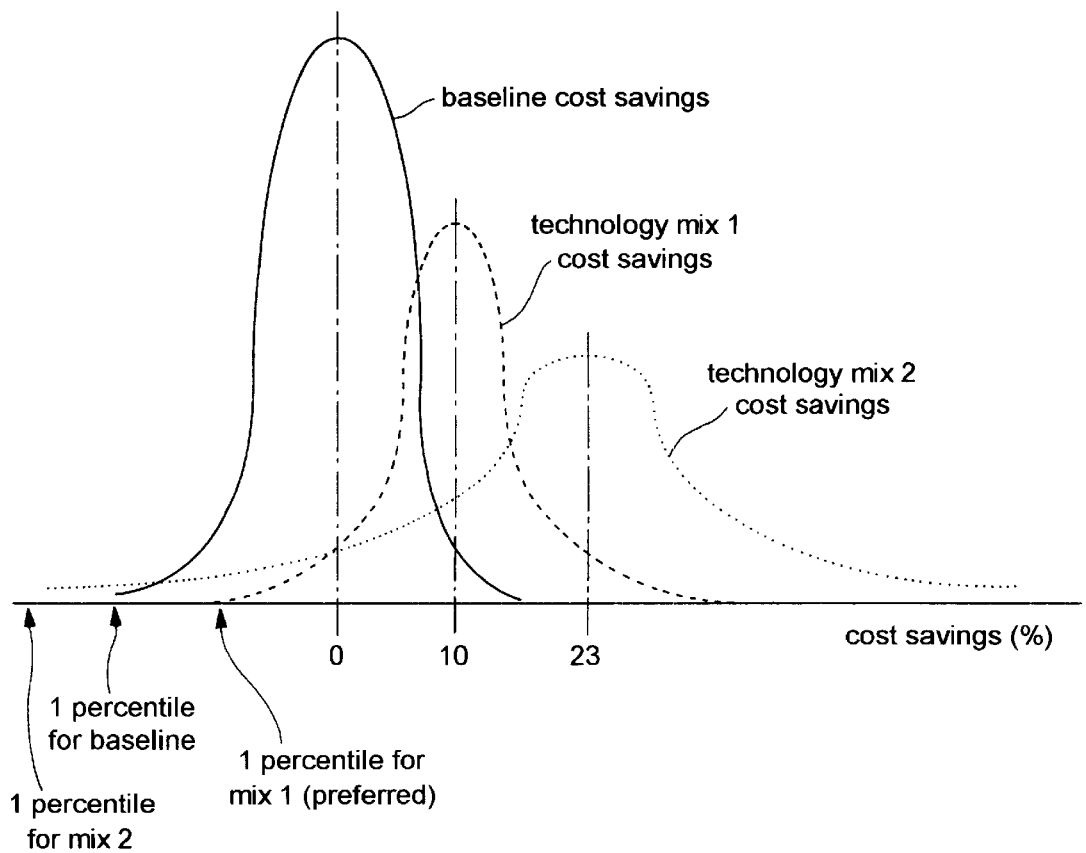
FIG. 3 is a series of exemplary curves comparing cost savings associated with two technology mixes with a baseline curve.

If now a variety of technologies are to be considered for an application, a mix of these technologies will yield the cost savings population corresponding to technology mix 1 shown in FIG. 3. This population has an average cost savings of 10% but a 1 percentile value higher than the 1 percentile value of the baseline population. Another mix, mix 2, has a higher mean savings (23%) but its 1 percentile value is significantly below the corresponding baseline value. Mix 1 is preferred since the cost savings with 1% probability that the cost will be lower is higher than the corresponding value for mix 2. The 1% probability is selected as a low risk approach. Other values can be chosen depending on company practices and program priorities.

The goal is then two-fold: Create a mix that moves the cost savings population as far to the right as possible (maximizing the mean savings) while keeping the total variance as low as possible (minimum scatter around the mean savings). The latter will be achieved by keeping the variance due to uncertainty below a pre-selected value. These two goals will tend to conflict with one another as the more promising technologies (in terms of increased cost savings) such as mix 2 in FIG. 3, are usually the ones with the higher variance. The two goals can be pursued simultaneously by requiring that the variance of a sufficiently small percentile of the entire savings population (for example, 1 percentile) be as high as possible. The higher the variance at the 1 percentile point, the higher the savings with a 1% probability that this savings will not be met.

The problem is, therefore, formulated as follows: Given an application (such as a helicopter fuselage) and a set of candidate resources (e.g., technologies) each of which will result in cost savings described by a mean $\mu$ and a variance due to uncertainty $\sigma^2$, find which of and to what extent the candidates should be used in order to maximize cost savings and keep the resulting variance below a prescribed (target) variance value. The procedure is repeated for a range of target variance values (that is, for a range of risks) resulting in a series of optimum mixes. The optimum technology mix is the one that achieves the highest savings for a given preselected probability value (e.g., 1% probability). The solution to this problem is presented below. This preselected value can be arbitrary, or can be based on experience from previous applications of the method. If it is arbitrary, the approach can be repeated for different values of the preselected variance in order to determine the dependence of the 1% probability cost savings on variance (and the technology mix). This is the approach selected here. A one percentile preselected value is used herein as a conservative value. Other values can be used depending on the level of risk one is willing to take. The approach to the solution will not change.

Solution—The Case of Two Candidate Technologies

The case where only two candidate technologies are available for implementation is very interesting because it can be solved in closed form and because it leads to greater insight for the general case. Consider a single part family (e.g., skins) where two technologies are considered for implementation. Each of the technologies has a (normal) cost savings distribution described by mean savings $s_i$, i=1,2, and variance $\sigma_i^2$, i=1,2. The percentage to be used from one technology is denoted by xi and the percentage to be used from the second is denoted by $x_2$, with:

$$0 \leq x_i \leq 1; i=1,2 \quad (3)$$

and $$x_1 + x_2 = 1 \quad (4)$$

where equation (4) denotes that the entire part family is to be made by the two technologies.

For each possible set of values of $x_i$ satisfying equations (3) and (4), the resulting cost savings population for the entire part family is $$S = x_1 s_1 + x_2 s_2 \quad (5)$$

with a resulting variance $$\sigma^2 = x_1^2 \sigma_1^2 + x_2^2 \sigma_2^2 \quad (6)$$

where the variance of the sum equals the sum of the variances of the individual populations has been used.

It is easy to see from equations (5) and (6) that if there were no constraints on the value of $\sigma^2$, the maximum possible value of S is obtained when the entire part family is made by one technology, the one with the highest value of savings $s_i$. This, however, may lead to a situation similar to that of mix 2 in FIG. 3, where it is probable that the actual savings can be lower than the baseline. For this reason, the value of $\sigma^2$ will be constrained so as not to be higher than a target variance value v for the resulting population:

$$x_1^2 \sigma_1^2 + x_2^2 \sigma_2^2 \leq v \quad (6)$$

The problem is then to maximize S as given by equation (5) subject to the constraints (3), (4), and (7). Three cases are distinguished:

Case 1: Assume $v \geq \sigma_1^2 \geq \sigma_2^2$. Note that the assumption $\sigma_1^2 \geq \sigma_2^2$ is one of convenience, with no loss of generality. Using equation (4) to substitute in (7):

$$x_1^2(\sigma_1^2 + \sigma_2^2) + \sigma_2^2 - 2x_1\sigma_2^2 \leq v \quad (8)$$

Figure 4A:
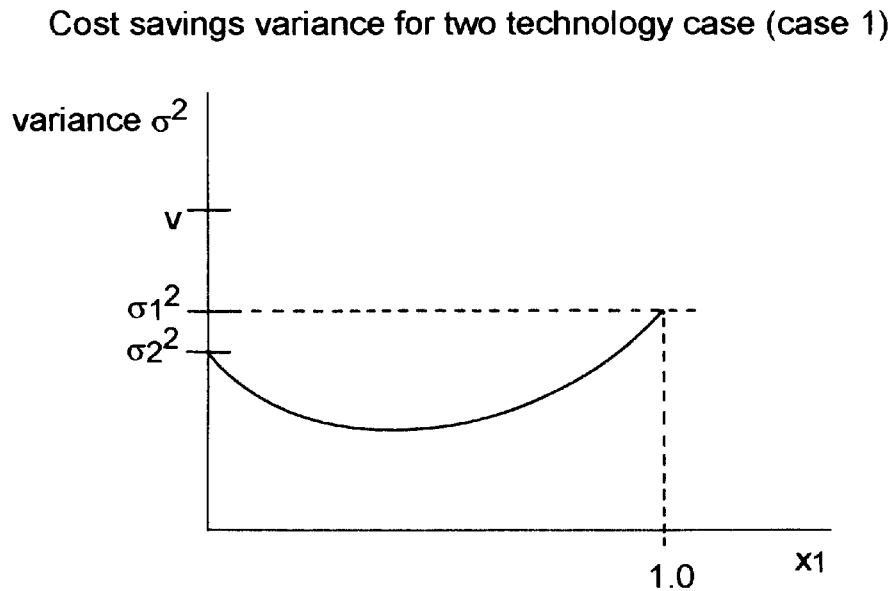
FIG. 4a is a curve showing the cost savings variance for a two technology case.

The right hand side of equation (8) is plotted in FIG. 4a as a function of $x_1$. As is seen from this figure, any value of $x_1$ satisfies condition (8). Then, the optimum mix corresponds to the one that maximizes the savings given by equation (5) which using equation (4) becomes, $$S = x_1(s_1 - s_2) + s_2 \quad (9)$$

Figure 4B:
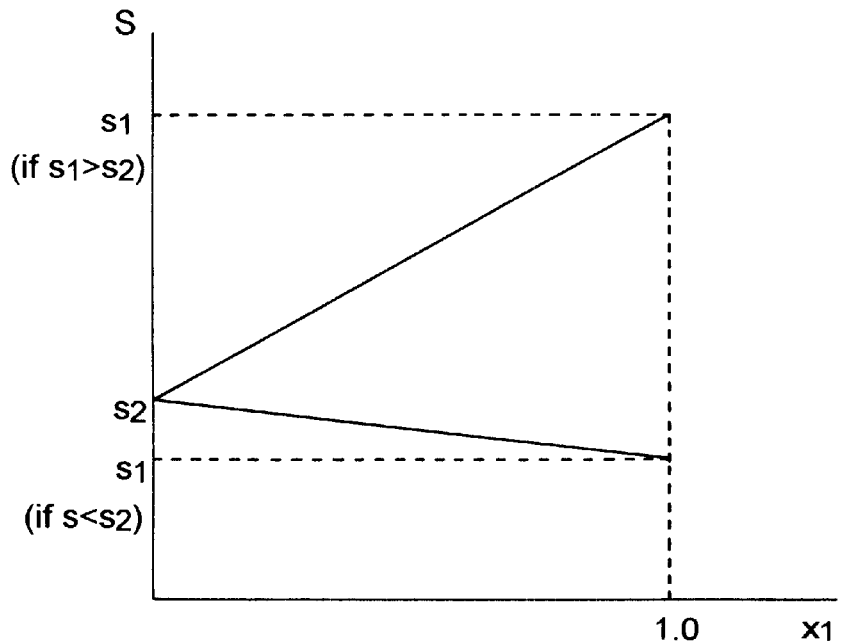
FIG. 4b is a cost savings curve for a two technology case.

The savings S given by equation (9) is plotted in FIG. 4b. Two cases are distinguished, one for $s_1 > s_2$ and one for $s_1 < s_2$. As can be seen from FIG. 4b, if $s_1 > s_2$, the optimum solution is $x_1 = 1$ and $x_2 = 0$. If $s_1 < s_2$, the optimum solution is $x_1 = 0$ and $x_2 = 1$.

Figure 5:
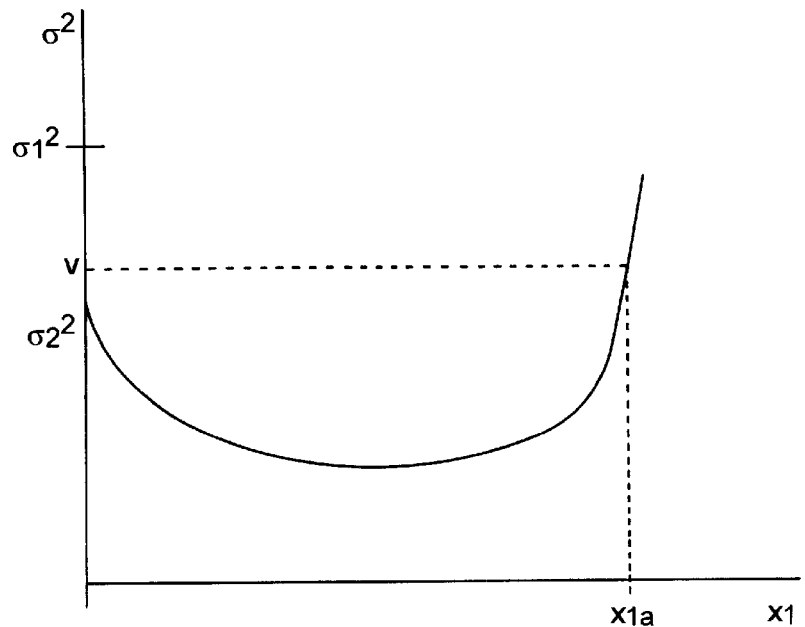
FIG. 5 is a cost savings variance curve for a two technology case.

Case 2: Assume $\sigma_1^2 \geq v \geq \sigma_2^2$. In this case, the plot of equation (8) is shown in FIG. 5. Here, solutions are possible only for $x_1 \leq x_{1a}$ otherwise condition (7) is violated. The value of $x_{1a}$ is found by changing the inequality of equation (8) to an equality and solving for $x_1$. There will be two solutions for $x_{1a}$, one negative and one positive. The negative one is discarded. The result is:

$$x_{1a} = \frac{\sigma_2^2 + \sqrt{v(\sigma_1^2 + \sigma_2^2) - \sigma_1^2 \sigma_2^2}}{\sigma_1^2 + \sigma_2^2} \quad (10)$$

Once $x_{1a}$ is determined, the procedure is analogous to case 1. If $s_1 > s_2$ the optimum solution is obtained for $x_1 = x_{1a}$ and $x_2 = 1 - x_{1a}$. If $s_1 < s_2$, the optimum solution is given by $x_1 = 0$ and $x_2 = 1$.

Case 3: Assume $s_1^2 \geq \sigma_2^2 \geq v$. Here, the minimum $v_{min}$ of the variance versus $x_1$ curve as described by equation (8) plays an important role. This minimum is found by differentiating the left hand side of equation (8) with respect to $x_1$ and setting the result to zero. Then, the variance of the cost savings population is minimized for $x_1 = x_{1b}$ where $$x_{1b} = \frac{\sigma_2^2}{\sigma_1^2 + \sigma_2^2} \quad (11)$$

and the minimum variance is $$v_{min} = \frac{\sigma_1^2 \sigma_2^2}{\sigma_1^2 + \sigma_2^2} \quad (12)$$

Figure 6:
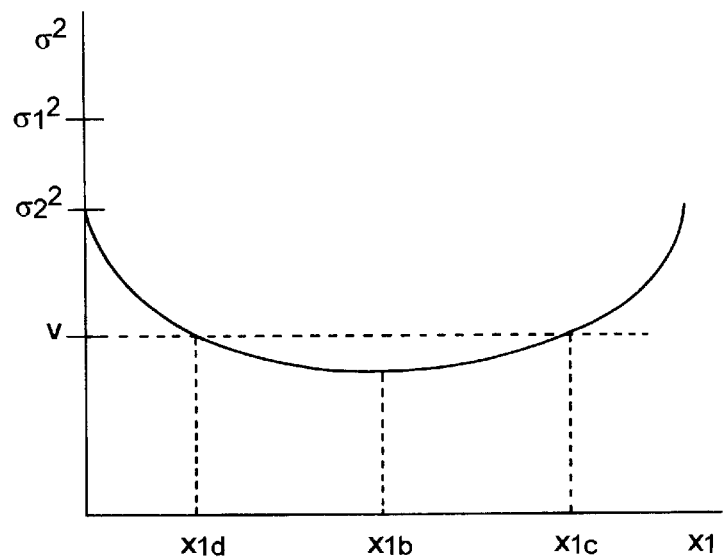
FIG. 6 is another cost savings variance curve for a two technology case.

There are three possibilities: (a) the target variance intersects the variance versus $x_1$ curve of equation (8) at two points $x_{1c}$ and $x_{1d}$ (see FIG. 6); (b) the target variance intersects the variance versus $x_1$ curve of equation (8) at one point $x_{1e}$, i.e., $v = v_{min}$; and (c) there are no intersections between the target variance and the variance versus $x_1$ curve.

In case (a), condition (8) can be satisfied only if $x_{1d} \leq x_1 \leq x_{1c}$. The two values for $x_{1d}$ and $x_{1c}$ are determined by changing the inequality in equation (8) to an equality and solving for $x_1$:

$$x_{1c} = \frac{\sigma_2^2 + \sqrt{v(\sigma_1^2 + \sigma_2^2) - \sigma_1^2 \sigma_2^2}}{\sigma_1^2 + \sigma_2^2} \quad (13)$$

$$x_{1d} = \frac{\sigma_2^2 - \sqrt{v(\sigma_1^2 + \sigma_2^2) - \sigma_1^2 \sigma_2^2}}{\sigma_1^2 + \sigma_2^2} \quad (14)$$

Note that $x_{1c}$ is the same as $x_{1a}$ from case 2. If $s_1 > s_2$, the optimum solution is obtained for $x_1 = x_{1c}$ and $x_2 = 1 - x_{1c}$. If $s_1 < s_2$, the optimum solution is obtained for $x_1 = x_{1d}$ and $x_2 = 1 - x_{1d}$.

In case 2, irrespective of whether $s_1 > s_2$ or $s_1 < s_2$, there is only one possible solution (see FIG. 6) and is given by $x_1 = x_{1b}$ and $x_2 = 1 - x_{2b}$. Finally, for case 3 there are no values of $x_1$ that satisfy condition (8). Therefore, the "optimum" technology mix is the baseline itself. The results for all these cases are summarized in Table 4.

TABLE 4

Optimum Technology Mix for the Two-Technology Problem (Minimum Recurring Cost with $\sigma_1^2 \geq \sigma_2^2$)

| | | Optimum Technology Mix $x_1, x_2$ | |
|---|---|---|---|
| Case | Target Variance v | $s_1 > s_2$ | $s_1 < s_2$ |
| 1 | $v \geq \sigma_1^2 \geq \sigma_2^2$ | $x_1 = 1$ $x_2 = 0$ | $x_1 = 0$ $x_2 = 1$ |
| 2 | $\sigma_1^2 \geq v \geq \sigma_2^2$ | $x_1 = x_{1a}$ (eq. 10) $x_2 = 1 - x_{1a}$ | $x_1 = 0$ $x_2 = 1$ |
| 3a | $\sigma_1^2 \geq \sigma_2^2 \geq v$ and $v > v_{min}$ eq.(11) | $x_1 = x_{1c}$ (eq. 13) $x_2 = 1 - x_{1c}$ | $x_1 = x_{1d}$ (eq. 14) $x_2 = 1 - x_{1d}$ |
| 3b | $\sigma_1^2 \geq \sigma_2^2 \geq v$ and $v = v_{min}$ eq.(11) | $x_1 = x_{1b}$ (eq. 11) $x_2 = 1 - x_{1b}$ | $x_1 = x_{1b}$ (eq. 11) $x_2 = 1 - x_{1b}$ |
| 3c | $\sigma_1^2 \geq \sigma_2^2 \geq v$ and $v < v_{min}$ eq.(11) | no solution, use baseline | no solution, use baseline |

Solution—The Case of N Candidate Technologies (N≥2)

Let $s_{ij}$, $\sigma_{ij}^2$ denote the mean and variance of the cost savings realized by applying technology j to part family i. Also, let $x_{ij}$ denote the percentage of family i to be fabricated using technology j. The problem of N technologies then takes the form:

Determine $x_{ij}$ such that the cost savings $C_s$ with $$C_s = \sum_{i=1}^{6} d_i \sum_{j=1}^{N} x_{ij} s_{ij} \quad (15)$$

is maximized subject to:

$$\sum_{i=1}^{6} d_i^2 \sum_{j=1}^{N} x_{ij}^2 s_{ij}^2 \leq v \quad (16)$$

$$0 \leq x_{ij} \leq 1 \quad (17)$$

$$\sum_{j=1}^{N} x_{ij} = 1, \quad (i = 1, \ldots 6) \quad (18)$$

where v is the target variance for the entire fuselage and $d_i$ denotes the cost fraction of the entire fuselage that part family i accounts for. The limit 6 for index i corresponds to the six major part families the fuselage is divided into (see Table 1). The Miscellaneous part family is not considered here.

As can be seen from equation (16), the problem is nonlinear and for N>2 cannot be solved in closed form. Variations to this portfolio management problem can be found in the literature. The discrete problem where $x_{ij}$ assumes only integer values is the knapsack problem disclosed in Carraway, R. L., Schmidt, R. L., and Weatherford, L. R., "*An Algorithm for Maximizing Target Achievement in the Stohastic Knapsack Problem with Normal Returns*", *Naval Research Logistics*, vol 40, pp 161–173 (1993); and Henig, M. I., "*Risk Criteria in a Stochastic Knapsack Problem*", *Operations Research*, vol 38, pp 820–825 (1990), both incorporated herein by reference in their entirety. In these references, the mean savings $s_{ij}$ is treated as a random variable reflecting the fact that the mean cost savings is not necessarily known accurately. In the present invention it is treated as a constant number. Variants of the problem can be found in Salkin, H. M., and Kluyver, C. A., "*The Knapsack*

*Problem: A Survey", Naval Research Logistics Quarterly*, vol 22, 1975, pp 127–144 (1975), incorporated herein by reference in its entirety, which has a survey of the knapsack problem and Steinberg, E., and Parks, M. S., *"A Preference Order Dynamic Program for a Knapsack Problem with Stochastic Rewards". J. Opl Research Society*, vol 30, pp 141–147 (1979), incorporated herein by reference in its entirety, where a dynamic programming approach is proposed. The major differences between the current problem and the solutions found in the literature is that one of the constraints in the current problem is nonlinear and that the unknowns are continuous variables instead of integers.

A simple search algorithm is used to solve the problem. This will not be the most efficient algorithm but will yield the optimum solution and will be used to generate trends and conclusions about the effect of using various manufacturing technologies on fuselage structure.

Before proceeding with the solution algorithm, one simplifying assumption is in order. It is assumed that a selection of technologies for one part family does not affect the selection for another part family. This is approximately valid. In extreme cases, design configurations can be generated that integrate parts of different part families together, e.g., frames and fittings. In such extreme cases, the decision to apply a certain technology mix for one family may affect another.

This inter-dependence will be neglected. As such, the problem for the entire fuselage can be broken up into six independent problems that can be solved individually. To solve each individual problem, the target variance for each individual part family must be known. It must be such that the sum of all target variances equals the target variance for the entire fuselage. Several options are available for determining the target variance values for each part family. Here, the simplest case will be used where all part families are assumed to have the same variance value. This is equivalent to assuming that the level of production-readiness of the technologies selected and the operator or equipment variability are the same across part families. Other assumptions are possible. The approach to the solution will not change.

Denoting the (constant) cost savings variance for all part families by $\alpha^2$, the fact that:

$$v = \sum_{i=1}^{6} d_i^2 \alpha^2 \tag{19}$$

gives $$\alpha^2 = v / \sum_{i=1}^{6} d_i^2 \tag{20}$$

The problem is simplified to solving the six individual problems:
Maximize $$C_s^{(i)} = \sum_{j=1}^{N} x_{ij} s_{ij} \quad (i = 1, \ldots 6) \tag{21}$$

subject to:

$$\sum_{j=1}^{N} x_{ij}^2 \sigma_{ij}^2 \leq \alpha^2, \quad (i = 1, \ldots 6) \tag{22}$$

$$0 \leq x_{ij} \leq 1 \tag{23}$$

$$\sum_{j=1}^{N} x_{ij} = 1, \quad (i = 1, 2, \ldots 6) \tag{24}$$

with $\alpha^2$ given by equation (20).

In proceeding with the solution, it is noted that due to the linearity of the objective function in equation (21), the maximum lies on the boundary defined by the N-dimensional space spanned by $x_{ij}$. A search algorithm is used. For each part family (i fixed), one value of $x_{ij}$ is set equal to zero or one (which defines the boundary). The remaining $x_{ij}$ values are varied between zero and 1 such that their sum is always 1 and equation (22) is satisfied as an equality. For each set of acceptable $x_{ij}$, the corresponding cost savings is calculated and compared to the maximum up to that point. If the new cost savings value is higher, the optimum mix values are updated and the next set of $x_{ij}$ values is examined. The procedure is repeated for all part families (i=1, ..., 6). The detailed steps are as follows:

1. Select $x_{ij}$ increment (typically equal to 0.015).
2. For each value of j (j=1, ..., N–2):
3. Set $x_{ij}$=0
4. For each value of k≠j, set $x_{ik}=x_{ik}$+increment
5. If $x_{ik}>1-x_{i1}-\ldots x_{i(k-1)}$ return to step 4.
6. Calculate $x_{iN}$ and $x_{i(N-1)}$ using equations (24) and (22).
7. Verify that, for all $x_{ij}$, condition (23) is satisfied. If not, return to step 4.
8. Calculate cost savings $C_s^{(i)}$ from equation (21).
9. Compare current $C_s^{(i)}$ with maximum value of $C_s^{(i)}$ up to this point. If current value is greater, update optimum $C_s$ value and corresponding set of $x_{ij}$.
10. Return to step 3 and repeat for a new value of i.
11. Once all values of i have been checked, calculate overall cost savings and variance values using equations (15) and (16).

The procedure to determine the maximum cost savings was coded in a computer program using FORTRAN.

The above algorithm. while not the most efficient, was found to be very powerful and effective in finding the maximum on the boundary for values of N up to seven. The algorithm will work with any value of N but will be slower as N increases significantly beyond 10.

The size of the increment set in step 1 above has a significant effect on running time and accuracy. For example, a value of 0.05 for the increment was found to decrease the running time (on a VAX 11/785) by a factor of three to four, depending on the problem, over an increment value of 0.015. At the same time, the optimum result was off by approximately 10% over the value obtained with an increment of 0.01 and 9% with an increment of 0.015. The results presented below were obtained using a value for the increment of 0.015.

Example of a Generic Helicopter Structure

The present invention can be utilized to determine the optimum technology mix for fabricating a generic helicopter fuselage while minimizing cost and risk. Seven candidate technologies are considered: (1) Sheet metal (SMT), (2) Hand Layup of composites (HLP), (3) High Speed Machining of aluminum (HSM), (4) Automated Fiber Placement of composites (AFP), (5) Pultrusion of composites (PLT), and (6) Automated Layup of composites (ALP) which combines automated tape layup and robotics pick-and-place capabilities.

These seven technologies are applied to the first six part families of a fuselage (see Table 1). The last part family, the miscellaneous family, includes a variety of parts (seals, transparencies, etc.) and it is difficult to determine to what extent (if any) the technologies considered can be applied. For this reason the last part family is not included in the optimization. However, in the end, the final cost savings value determined by optimization on the first six part family is increased by a factor that reflects savings realized in the miscellaneous part family due to reduced assembly and increased automation which is expected to be introduced across all part families once the technologies considered above are implemented on the other part families. This factor was estimated based on historical data for the effect of automation and reduced assembly to be 8% of the cost of the miscellaneous part family. The overall cost savings value is increased by this amount which, for the example given in Table 5, is an additional 1.3%.

The baseline cost and weight distributions for the six part families of the fuselage are shown in Table 5. These constitute the generic fuselage of today (civil application) which is assumed to be made by sheet metal (SMT) with a small contribution (10%) of composite hand layup (HLP).

TABLE 5

Baseline Cost and Weight Distributions for Generic Fuselage

| Part Family | Percent of Fuselage by Cost | Percent of Fuselage by Weight |
| --- | --- | --- |
| Skins & Covers | 10.3 | 24.9 |
| Frames, Bulkheads . . . | 18.1 | 23.6 |
| Stringers | 2.9 | 1.6 |
| Fittings | 9.1 | 4.3 |
| Decks & Floors | 5.9 | 9.6 |
| Doors & Fairings | 36.9 | 18.0 |
| Miscellaneous | 16.8 | 18.0 |

For each of the seven technologies considered, the mean and variance of the cost savings when the technology is applied to each of the first six part families is needed. Representative numbers for these quantities are given in Tables 6 and 7.

TABLE 6

Mean of Cost Savings Population
(e.g. 0.15 = 15% Cost Savings)

| | SMT | HLP | HSM | AFP | RTM | PLT | ALP |
| --- | --- | --- | --- | --- | --- | --- | --- |
| Skins | 0.0 | 0.17 | 0.2 | 0.25 | 0.08 | 0.08 | 0.32 |
| Frames | 0.0 | 0.1 | 0.28 | 0.1 | 0.18 | — | 0.40 |
| Stringers | 0.0 | −0.05 | (in skins) | — | 0.05 | 0.40 | 0.35 |
| Fittings | 0.0 | — | 0.2 | — | −0.10 | — | — |
| Decks | 0.0 | −0.01 | — | 0.15 | −0.15 | — | 0.20 |
| Doors | 0.0 | 0.1 | — | 0.25 | −0.10 | — | 0.35 |

Negative values in Table 6 indicate an increase in mean cost over baseline. The variance value of 0.0001 for the baseline (SMT) in Table 7 reflects the fact that this is a well known and implemented technology with almost no cost uncertainties. The only cost variation for SMT would be due to part complexity. Entries without values in Tables 6 and 7 indicate that the part family cannot, in general, be fabricated with the selected technology irrespective of the design concept.

TABLE 7

Variance (Due to Uncertainty) of Cost Savings Population

| | SMT | HLP | HSM | AFP | RTM | PLT | ALP |
| --- | --- | --- | --- | --- | --- | --- | --- |
| Skins | 0.0001 | 0.0061 | 0.02 | 0.009 | 0.003 | 0.06 | 0.01 |
| Frames | 0.0001 | 0.0001 | 0.006 | 0.06 | 0.008 | — | 0.08 |
| Stringers | 0.0001 | 0.0001 | (in skins) | — | 0.002 | 0.001 | 0.09 |
| Fittings | 0.0001 | — | 0.005 | — | 0.015 | — | — |
| Decks | 0.0001 | 0.0001 | — | 0.01 | 0.008 | — | 0.02 |
| Doors | 0.0001 | 0.0021 | — | 0.026 | 0.01 | — | 0.05 |

The cost savings values in Table 6 are over the baseline SMT case with cost normalized by the weight of the finished product (hrs/kg). These values include labor (including assembly to surrounding components) and material cost (including scrap). A labor rate of 100$/hr was used in this example.

It should be noted that the values in Tables 6 and 7 are based on data collected over time from various sources and on assumptions about the performance of various technologies on the different part families. The mean and variance values for new technologies were estimated by comparisons with similar technologies and applications for which such data were available and by scaling up limited available laboratory data. Any other set of values can be used.

Sample calculations of the entries in Tables 6 and 7 are given for the HLP skins case. As mentioned above, the mean cost of hand laid up skins is 8.74 hrs/kgr. The mean cost of sheet metal skins is approximately 10.5 hrs/kgr. This value is an average over a wide variety of skins with compound curvature and significant amount of assembly. The mean cost savings is then (10.5−8.74)/10.5=0.166 which was rounded to 0.17 in Table 6.

For the corresponding variance, the standard deviation value of 0.094 discussed above is used. This was for the cost normalized by the mean cost. Therefore, the variance of the cost of HLP skins is 0.0942×8.732=0.673. Thus, the variance of the cost savings is given by:

0.673/10.52=0.0061 which is the value in Table 7.

Note that this expression for the variance of the cost savings is valid only when the variance of the baseline (SMT) is nearly zero which happens to be the case here. Otherwise the more elaborate expression for the variance of the ratio of two populations would have to be used.

The data in Tables 6 and 7 show that the technology with the highest cost savings (ALP) has the highest uncertainty (variance values). This is because much of the robotics technology required in ALP is still in the laboratory stage and some years away from implementation in production. The mean and variance values used for ALP were determined by scaling up laboratory data. Despite the uncertainty, ALP is included in the list of candidate technologies since, for it to be implemented two to three years from now (which is the time horizon for implementation of the current study), work for its productionization should start now. This way, as more data becomes available, the study and results can be updated.

The software code was run using the data from Tables 5–7 as input and varying the target variance of cost savings for the entire fuselage. For each target variance value, the optimum technology mix was obtained and the associated mean cost savings. Knowing the mean cost savings and the variance, then the cost savings corresponding to a certain probability that cost savings will be lower can be obtained. This calculation is simple for normal distributions (which was the assumption here) for which the mean and variance values are known. Given a level of confidence, the cost savings value that will be exceeded by a certain percentage of the population is given as the difference between the mean and the standard deviation multiplied by the one-sided tolerance limit factor. See, *Military Handbook 5E, Metallic Material and Elements for Aerospace Vehicle Structures,* vol 2, US DoD, Table 9.6.4.1 (1987). Here, a 50% confidence level was used and the one-sided tolerance limit factors corresponding to an infinite population.

Figure 7:
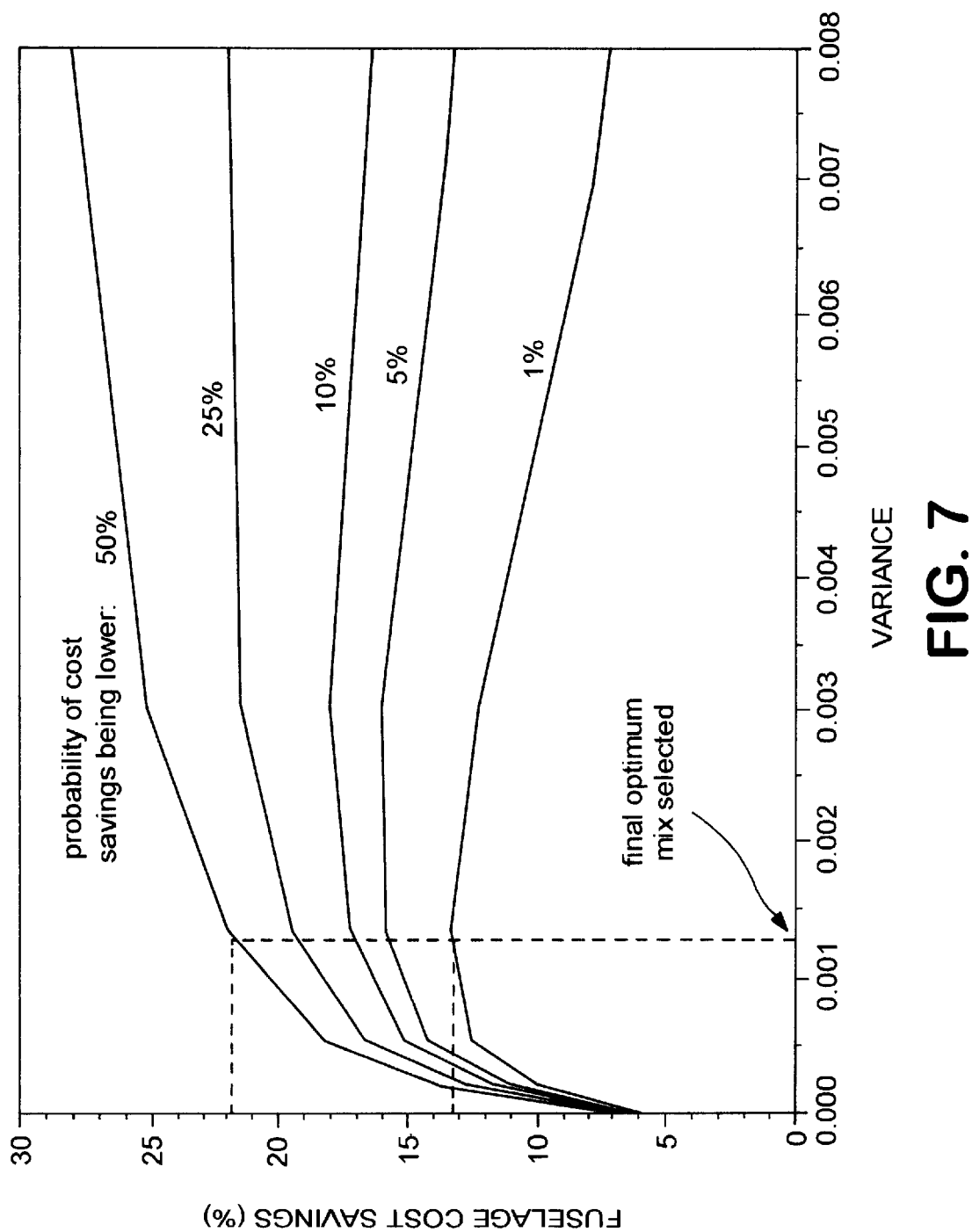
FIG. 7 is a plot of the variance associated with cost savings for various probabilities.

The results are shown in FIG. 7 where the cost savings is shown as a function of variance. The curves in FIG. 7 were constructed as follows: First, a target variance for the entire fuselage was selected. Then, the optimization approach described above was used to determine the mix of technologies that will give the highest mean cost savings without exceeding the target variance. The mean and variance values of the resulting optimum mix were used to determine the cost savings with different probability of occurrence. Thus, for each target variance value, five cost savings values were determined: The 50%, 25%, 10%, 5% and 1% probability points. These points show what the cost savings will be with the corresponding probability of falling below that savings value for the optimum mix associated with the target variance value selected. The procedure is repeated for other target variance values and thus the curves in FIG. 7 are traced.

Each value of variance corresponds to a different optimum technology mix (which gives the highest mean cost savings for that variance value). However, the probability points corresponding to the same target variance value, are all associated with the same optimum technology mix. For a point on a given curve, there is a certain probability (shown on the curve) that the cost savings will be lower than the value that the point represents.

Very small variance values imply minimum departure from the baseline and the corresponding savings is small. For high variance values (greater than 0.008), the technology mix switches to the technology that has the highest cost savings for each part family which also has the highest variance. Any further increase in the target variance will not alter the technology mix beyond this point.

The curves corresponding to the 50% and 25% probabilities increase monotonically with variance. On the other hand, the curves corresponding to 10%, 5%, and 1% probabilities go through a maximum cost savings value and then decrease. This is because, for low probability values, the variance associated with the individual technologies is very high and thus more than offsets any savings that the technologies can achieve on a mean or 25% probability basis.

FIG. 7 shows what happens as the risk that a business is willing to take increases. As was mentioned earlier, the variance is a measure of risk. The higher the variance, the higher the risk. This is reflected by the fact that the range of cost savings between the 50% and 1% probability lines increases as the variance increases. Clearly, opting for the technology mixes that correspond to high variance values is very risky since there is a good chance that the cost savings will be significantly below the mean cost savings (i.e., below the 50% probability curve). In fact, for intermediate variance values the cost savings with down-side savings probabilities between 1 and 10% is higher than for higher variance values.

At the same time, the reduction in cost savings with 50% or 25% probabilities of lower savings is small. Therefore, the optimum mix will correspond to some intermediate variance value. It will be the mix corresponding to the maximum cost savings value of the 10%, 5%, or 1% probability lines (the maximum occurs at a different variance value for each).

The technology mix to be selected will depend on the probability line that one wishes to use. The conservative approach utilized herein is to use the 1% probability line which goes through a maximum for a variance value of 0.00114 (see FIG. 7). The corresponding cost savings is 13.3%. That is, the mix selected will have only 1% probability of the cost savings being lower than 13.3%. At the same time the same mix will have a 50% probability that the cost savings will be lower than 21.9%. The range 13.3–21.9% can be viewed as the range of savings that can reasonably be expected from implementing the corresponding mix. This selection is conservative but reasonable considering the large investment (non-recurring cost) that is needed to implement the technologies in the mix and the need to "guarantee" a good return on that investment. Depending on personal preferences, willingness to take risk, and other business considerations other selections can be made from FIG. 7.

The technology mixes for three variance values, 0.00002, 0.00114 (the selected overall optimum mix), and 0.007 are shown in FIG. 15. The percentage values given are by weight of the entire fuselage. These values cover the entire range of variance values and show how the optimum technology mix changes as the risk increases.

The first pie chart (FIG. 15*a*) corresponds to a very low risk technology implementation (very low variance value). As a result, the cost savings is low (4.7% with 50% probability of lower savings) and the range of expected savings is narrow (3.6% savings with a 99% probability of the savings being higher). More than 50% of the fuselage is made by the baseline technology (SMT) and about 25% is made by hand layup which is a low risk technology (cost savings variance values due to uncertainty are low as can be seen from Table 7). The remaining technologies HSM, AFP, RTM, PLT, and ALP have very low usage to keep the risk low and the variance from exceeding the target value of 0.00002.

The second pie chart (FIG. 15*b*) corresponds to the selected overall optimum mix that maximizes the savings with 1% probability of the savings being lower. Here, the baseline (SMT) has all but disappeared and has been replaced by a variety of technologies such as HLP (7%), HSM (21%), AFP (15%), and ALP (36.5%). This is in line with the understanding from investment and risk analysis that, to keep the risk manageable, a variety of options must be pursued. What is important is that through the approach developed here, the exact amounts to which each of the technologies must be used can be determined. In this mix, pultrusion (PLT) is kept at a low 1.2% mostly because it is efficient to use it on the stringers only which comprise a small portion of the entire fuselage.

The high risk technology mix is shown in FIG. 15*c*. Again, the baseline (SMT) is almost eliminated. Also, application of most of the other technologies has been curtailed drastically in favor of the automated layup (ALP) technology which makes up 68% of the fuselage. This is why the cost savings with 50% probability of lower savings has increased significantly to 27%. However, because of the high risk (variance) associated with the ALP technology (see Table 7), the cost savings with 1% probability of lower savings is only 8%, significantly below the corresponding value of 13% for the medium risk technology mix.

The detailed breakdown by part family for the overall optimum mix (FIG. 15b) is shown in Table 8.

TABLE 8

Overall Optimum Technology Mix (Variance = 0.00114)
Usage by Part Family (% of Corresponding Family by Weight)

|           | SMT  | HLP  | HSM  | AFP  | RTM | PLT  | ALP  |
|-----------|------|------|------|------|-----|------|------|
| Skins     | 0    | 0    | 0    | 15.5 | 0   | 0    | 84.5 |
| Frames    | 0.1  | 0    | 76.5 | 0    | 1.5 | 0    | 21.9 |
| Stringers | 0    | 0    | 0    | 0    | 0   | 72.4 | 27.6 |
| Fittings  | 16.7 | 0    | 78.8 | 0    | 4.5 | 0    | 0    |
| Decks     | 0    | 0    | 0    | 51.5 | 0   | 0    | 48.5 |
| Doors     | 0    | 37.5 | 0    | 34.0 | 0   | 0    | 28.5 |

As was seen in FIG. 15b, a significant percentage (36.5%) of the fuselage should be produced using ALP. Table 8 shows that the percentage is made up by the majority of skins and fairings, about half of the decks and floors, and about one quarter of frames, stringers and doors.

At the other end of the spectrum, SMT, PLT and RTM have very limited use. SMT is used only on fittings (17%), PLT only on stringers (72%) and RTM has very limited usage on frames and fittings. It should be noted that the use of RTM on fittings is somewhat sub-optimal because, as shown in Table 6, the savings in this combination is negative. The optimizer was forced in this situation by trying to match exactly the target variance in accordance with a rule built into the optimization that for technologies with percentages less than 5%, the equality sign in equation (16) is used in order to maximize the savings. By switching the 4.5% of RTM fittings to SMT, the variance would be somewhat smaller than the target variance for the entire fuselage and the cost savings higher. This increase in cost savings is almost negligible (0.04% for the 50% probability case) and is not considered of any significance. Alternatively, the 4.5% could be split between SMT and HSM so that the total variance does not exceed the target variance. This would give a slightly bigger increase in savings over the 0.04% value mentioned above.

The hand layup technology (HLP) accounts for an appreciable percentage (7%) of the entire fuselage even though applied to a single part family (doors and fairings). The technologies with the more extensive applicability are HSM on frames and fittings, and AFP on skins, decks, and doors.

It is important to keep in mind that the approach and results presented so far concentrate on recurring cost. The final selection of the optimum technology mix should take into account the investment (non-recurring cost) required to bring the selected technologies to production and at the selected levels. This non-recurring cost is made up of two parts. The process development cost and the product development cost. The former includes the cost to develop the technologies so they are ready for production and the cost of equipment that must be purchased. The latter includes the cost to create new designs for the new processes, new tools, testing, the associated analysis and certification/qualification cost.

This non-recurring cost may change the optimum mix selected. Consider for example the overall optimum mix of FIG. 15b and Table 8. The applicability of RTM and PLT is very little and their impact on cost savings is small. By dropping them from the technology mix, the non-recurring cost associated with developing these technologies and, in particular, the high tooling cost for RTM will not be incurred. Thus, a variation to the overall optimum mix can be created with a small penalty on the savings and a significant reduction on the associated non-recurring cost.

The following analysis modifies the approach described above to include the non-recurring cost in the optimization and the dependence of the results on time as technologies mature and more data become available that change the inputs in Tables 6 and 7. As alluded to earlier during the discussion of sources of uncertainty in cost, one can incorporate expected improvements over time by appropriately varying the variance values in Table 7. Thus, different optimum mixes for different time horizons can be created.

Non-recurring cost is the investment required to bring the technologies in the mix to production readiness (if they are not ready) and to develop the product (tooling, testing, drawings, analysis, certification etc.). The non-recurring cost for some of the technology mixes can be prohibitively high. In fact, as was pointed out above, it is possible, in certain cases, to decrease significantly the non-recurring cost with a very small penalty (decrease) on the recurring cost savings. It is, therefore, important to be able to incorporate the non-recurring cost in the decision process for implementing technologies. Even more so, selecting the optimum technology mix so that the non-recurring cost is as low as possible should be one of the possible goals of a program.

Another important consideration in planning technology implementation is the time element. Even if the non-recurring cost is part of the decision process for the selection of the optimum technology mix, it is almost certain that during the implementation that ensues, changes will occur that will put the selected optimum mix to the test. Certain technologies will not perform as expected, and others will outperform expectations. The ability to switch from the original implementation plan to another with improved recurring and/or non-recurring cost is paramount for program success. Therefore, there is a need for an approach that, along with the optimum technology mix and implementation plan, will provide a variety of options that can be selected depending on how the original implementation proceeds with time.

This portion of the analysis presents an attempt to determine the optimum time-dependent path for implementing the optimum technology mix as determined by the above analysis. In addition, it provides an approach to create alternative options that can be selected at later stages of the program as results from the implementation make the alternate options more attractive over the original implementation plan.

Technology Applicability

When considering the use of a certain technology to a part family, the applicability of the technology to the part family should be taken into account. This refers to the portion of the part family that can be made by the candidate technology at a given time. For mature technologies such as sheet metal or hand lay-up of composites, this is known. As an example, for skins and covers, the range would be 100% for either technology. On the other hand, for fittings. the applicability of hand lay-up would be very nearly zero since structurally adequate, low cost hand laid-up fittings of consistent quality are rare. For new and emerging technologies, the range of applicability is not known accurately and only estimates based on laboratory tryouts and scale-up extrapolations can be made.

Determining accurately the applicability of a technology on a part family is a challenge. Currently, due to the inclusion of new and emerging technologies in the candidate technology mixes, only estimates of these values can be obtained.

Time-Dependent Implementation Plan

The starting point is the technology mix available today. This can be a real technology mix corresponding to an existing program that will be modified to reduce recurring cost, or a fictitious mix that is set up to reflect technology capabilities today for a new program to be launched. The ending point is the optimum technology mix (as determined above) or a technology mix as close to it as possible. The starting and ending points correspond to different points in time.

For the generic fuselage example, the technologies discussed above have the typical recurring cost savings and associated variances of the cost savings distributions shown in Tables 6 and 7. The variance values can be viewed as a measure of the scatter around the mean cost savings that is caused by operator variability, level of production readiness of the technology, and other sources of uncertainty. The technologies are applied to the part families of the fuselage which is assumed to be broken up by weight or cost as shown in Table 5. This breakdown is assumed to correspond to the baseline technologies.

In order to proceed, certain assumptions for the non-recurring cost associated with implementation of the seven technologies mentioned are needed. The non-recurring cost is divided into (a) process development cost and (b) product development cost.

The process development cost covers the cost to make the selected technology production-ready. It includes the cost of fabrication of trial parts, changes to equipment and processing, training, testing of trial parts, tooling for trial parts, purchase and installation of equipment, and any additional cost associated with material and process development.

The product development cost covers the cost to develop the hardware. It includes drawings, analysis, tooling for production parts, fabrication and testing of parts for productibility and certification, and certification/qualification (writing, submitting, and revising reports, etc.).

The actual values of process and product development costs will vary with the technology, types of parts, and factory practices. For exemplary purposes, generic cost values (based on published rough estimates) are used here and are shown in Table 9. They are only used for illustration purposes and in order to demonstrate the approach.

TABLE 9

Non-Recurring Cost by Technology

| Technology | Process Development Cost ($) | Product Development Cost ($/kgr) |
|---|---|---|
| SMT | 0 | 37000 |
| HLP | 0 | 55000 |
| HSM | 1,000,000 | 33000 |
| AFP | 2,500,000 | 70000 |
| RTM | 1,000,000 | 73000 |
| PLT | 500,000 | 79000 |
| ALP | 1,500,000 | 103000 |

The process development cost is zero for the SMT and HLP technologies since they are used routinely today and are well understood. The remaining technologies require some investment to make them production-ready across the entire range of parts they can manufacture. It should be noted that the cost values given in Table 9 do not include the cost for purchasing equipment. Most of the equipment is assumed to be already available in-house or through outsourcing.

The product development cost values are given in terms of cost ($) per kgr of finished product. This is a simple way to relate the size of the part to the cost of the drawings, tooling, testing, analysis, and certification for this part. The values in Table 9 should be viewed as mean values. More detailed analysis would consider the scatter around these mean values due to component complexity, level of technology maturity, etc.

The information in Tables 5–7 and 9 can be combined to obtain various scenarios of technology implementation. Consider for example the case of SMT frames and bulkheads of a helicopter fuselage that are to be switched to two candidate technologies, HSM and RTM. Assume that no more than 40% of the frames and bulkheads can be switched per year to either of the two technologies. Then, a series of possible scenarios is shown in FIG. 8.

With reference to FIG. 8, one option available is an intermediate technology mix that may be selected at some point during implementation. In general, there is an infinite combination of options that represent intermediate states between the starting and ending points. The lines connecting options in FIG. 8 illustrate example paths. Each path segment has a certain non-recurring cost associated with it shown as a number next to the arrow connecting the end points of the segment. This is the investment required to change the technology mix from the one shown at the beginning of the segment to the one shown at the end of the segment. The total non-recurring cost associated with a particular path can be determined by adding the cost for the individual segments of the path. It will have the following form:

$$C_{nrec} = \sum_k \sum_j \left[ C_{proc}^{(j,k)} + \sum_i (x_{jk}^{(i)} - x_{j(k-1)}^{(i)}) C_W^{(i)} W C_{prod}^{(i)} \right] \quad (25)$$

where $C_{proc}^{(j,k)}$ is the process development cost for technology j for time k (point k in the path) given in Table 9 (column 2), $x_{jk}^{(i)}$ is the fraction of part family i (column 1 of Table 5) made by technology j at time k, $C_w^{(i)}$ is the fraction by weight of the entire fuselage comprised by part family i (column 2 of Table 5), W is the total weight of the fuselage, and $C_{prod}^{(j)}$ is the product development cost for process j (column 3 in Table 9)

In addition to the non-recurring cost, and the technology mix for each option, the recurring cost savings for the entire fuselage and the variance of the cost savings distribution are given at the bottom of FIG. 8.

The objective of primary interest is to determine the best possible path for reaching an optimum end-point technology mix (point 4 in FIG. 8). Here, "best possible path" means the path with the lowest non-recurring cost (required investment).

There are 8 possible paths going from point 0 to point 4 in FIG. 8. Even for this example, selecting the path with the lowest non-recurring cost by identifying all possible paths, calculating the cost and selecting the path with the lowest cost, can be a non-trivial task. In general, there will be infinite possible paths and selection of the optimum by enumeration is next to impossible. There are, however, approaches to solve this problem using dynamic programming. This problem is also known as the stagecoach problem and discussed in Wagner, H., *Principles of Operations Research*, 2$^{nd}$ ed. Prentice-Hall, Englewood Cliffs, N.J., 1975, incorporated herein by reference in its entirety. The solution is based on starting at the end and proceeding backwards. For each possible state, the path with the lowest cost that connects the current state to the end state can be determined. This is done by adding the cost between the current state and the next, to the cost of the lowest cost path connecting the next state with the end state and comparing the cost of the resulting possible paths. Once the starting point is reached, the lowest cost path will follow naturally from the algorithm.

In the case of FIG. 8, the lowest cost path found using this algorithm is: 0,1A,2A,3A,4. The associated non-recurring cost is $ 10.95 million (=3.25++4.19+1.85+1.66). For this example, the highest cost path is: 0,1A,2B,3A,4 with non-recurring cost of $ 12.12 million (=3.25+6.08+1.13+1.66) which is about 11% higher than the lowest cost path.

Besides finding the path with the lowest non-recurring cost, other possibilities for the best possible path are available. One alternative, is to find the path that, at any interim time gives the highest recurring cost savings given an acceptable risk level (variance of cost savings). This would correspond to a case where short term profits or increased market share through lower prices are a priority. In the case of FIG. 8, however, the example has been constructed in such a way that the cost savings and the variance for each option at any given year are exactly the same. This is not an improbable case. Due to the way the problem is formulated, there will always be two distinct solutions that give the same cost savings and variance for a given time span. However, in some cases, one of the solutions may be unacceptable (requiring percentages of at least one technology less than zero or higher than 100%).

Another alternative corresponds to a path that will maximize the return on investment (ROI) after a certain number of years. The ROI is defined as the internal rate of return. This is the rate that yields zero net present value of the investment required to implement the selected technology mix.

The last alternative of interest is the case where, instead of a single target (optimum) technology mix, more than one target technology mix is considered. This adds to the variety of options and will be examined briefly later.

Examination of FIG. 8 reveals several characteristics of technology implementation plans. These are discussed below.

1. There are paths that have the same intermediate recurring cost savings and variance values. In such a case, the only differentiating element is the non-recurring cost associated with the different paths.
2. Paths that contain options where one or more of the technology contents of the target mix are overshot result in extra non-recurring cost. This is the cost associated with implementation of the amount by which the intermediate options exceed the target mix. Such an example in FIG. 1 is path 1B,2B where the amount of RTM frames increases from 18.8% to 38.1%. Since every possible path stemming from option 2B has a lower RTM content, the cost to increase the implementation from 18.8 to 38.1% is not recovered. From this point of view such paths are suboptimal. However, they may be necessary if other technologies are not yet fully production-ready. Then, for example, RTM could be used as a temporary solution until HSM can be substituted. Tools, drawings, etc., made for RTM parts will, for the most part, not be usable when the switch to HSM is made.
3. Under certain conditions, the non-recurring cost is independent of the path and depends only on the starting and finishing points. This can be seen from equation 25 if it is evaluated for two successive values of k:

$$C_{nrec} = \ldots + \sum_j \left[ C_{proc}^{(j,k-1)} + \sum_i (x_{j(k-1)}^{(i)} - x_{j(k-2)}^{(i)}) C_w^{(i)} W C_{prod}^{(j)} \right] +$$

$$\sum_j \left[ C_{proc}^{(j,k)} + \sum_i (x_{jk}^{(i)} - x_{j(k-1)}^{(i)}) C_w^{(i)} W C_{prod}^{(j)} \right] + \ldots =$$

The terms involving $x_{j(k-1)}^{(i)}$ cancel (provided $x_{j(k-1)}^{(i)} > x_{j(k-1)}^{(i)}$). It is further assumed that $C_{proc}^{(j,k)}$ is independent of k. This would be the case where the total process development cost is divided evenly over a number of successive states $k_p$ ($k_p$, $N_k$) and is incurred no matter which of the alternative paths is selected. Then, for k ranging from $k_1$ to $N_k$, the nonrecurring cost is given by:

$$C_{nrec} = \Sigma [C_{proc}^{(j,k)} + \Sigma (x_{j(Nk)}^{(i)} - x_{j(k1)}^{(i)}) C_w^{(i)} W C_{prod}^{(i)}] \qquad (26)$$

which depends only on the starting and finishing states $k_1$ and $N_k$.

4. Paths that use the least amount of "not-needed" technologies discussed in point 2 are less costly. This can be seen from FIG. 8 by comparing paths 1B,2A,3B and 1B,2B,3B. These have the same starting and ending points. However, in the latter case, the RTM content increases at an intermediate step (to 38.1%) and then decreases to the final value of 35%. In the former case, the RTM content decreases from 18.8 to 17.6% and then increases to the final value of 35%. The cost incurred with the decrease form 18.8 to 17.6% is less than the cost incurred with the decrease from 38.1 to 35%.

Maximum Amount of Implemented Technology as a Function of Time

As discussed above, the target is the optimum technology mix. Very little attention has been paid to the technology applicability. It is conceivable, that the technology mix determined by the above approach may not be feasible in practice because the maximum applicability of the technologies is smaller than that required by the technology mix. For example, the optimum mix requires that 84.5% of the skins be made by ALP. This may not be possible for a number of years, or it may not be possible at all if a significant number of the skins in the fuselage are too complex to be made by ALP. The following discussion provides a way to determine the maximum applicability of any technology on any part family as a function of time.

Modeling the amount of a structure (such as an entire fuselage) that is made by a technology as a function of time, requires some understanding of the rate at which the technology can be implemented. It is expected that for a new technology, the amount made at the beginning will be small. This is due to the fact that time is spent in making the technology production-ready and resolving technical problems (scale-up etc.). After the technology is made production-ready and the technical issues are resolved, the amount made by the technology will increase at a nearly constant rate. This is because the equipment and personnel used will have reached a constant high rate of production. It will hold true as long as the complexity of the parts made is not high. For high complexity parts, the rate will decrease as issues associated with the increased complexity require resolution.

This qualitative discussion differentiates three stages of technology implementation. At an early stage, the rate of implementation is low due to problems associated with the technology. At the intermediate stage, the rate is nearly constant. At the later stages of implementation, the rate slows down due to problems associated with the components to be fabricated. It should be noted that this model assumes that the majority of the more complex parts are manufactured at the latter stages of the technology implementation.

In order to quantitatively describe this model, one resorts to the properties that the rate of technology implementation is expected to have based on the previous discussion. In what follows, the fraction of a part family that has been changed over to a new technology is denoted by f(t) ($0 \leq f \leq t$). It can be shown that the qualitative characteristics described above are captured by assuming that the second derivative of f(t) with respect to time is linearly related to f(t) itself:

$$\frac{d^2 f}{dt^2} = k_0 - k_1 f \quad (27)$$

where t is time, and $k_0$, $k_1$ are unknown constants with $k_1 > 0$. The following boundary conditions are imposed:
1. For a new technology,
   (a) f=0 at t=0 (no technology implemented)
   (b) df/dt=0 at t=0 (the amount of technology implemented is implemented at a very slow rate at the beginning until the technology is production ready and technical issues are resolved)
   (c) f=p at t=2τ where 2τ is the total time required to implement the maximum applicability p.
   (d) df/dt=0 at t=2τ (the rate of technology implementation slows down to zero when maximum applicability p is approached due to high complexity of the parts to be fabricated)
2. For a mature technology,
   (a) f=0 at t=0 (no technology implemented)
   (b) f=p at t=2τ where 2τ is the total time required to implement the maximum applicability p.
   (c) df/dt=0 at t=2τ (the rate of technology implementation slows down to zero when maximum applicability p is approached due to high complexity of the parts to be fabricated)

The solutions to equation 27 that satisfy the boundary conditions are:

$$f = \frac{p}{2}\left(1 - \cos\left(\frac{\pi t}{2\tau}\right)\right) \text{ for a new technology} \quad (28)$$

with $k_0 = p\pi^2/(8\tau^2)$ and $k_1 = \pi^2/(4\tau^2)$ and $$f = p\left(\sin\left(\frac{\pi t}{4\tau}\right)\right) \text{ for a mature technology} \quad (29)$$

with $k_0 = 0$ and $k_1 = \pi^2/(16\tau^2)$

Figure 9:
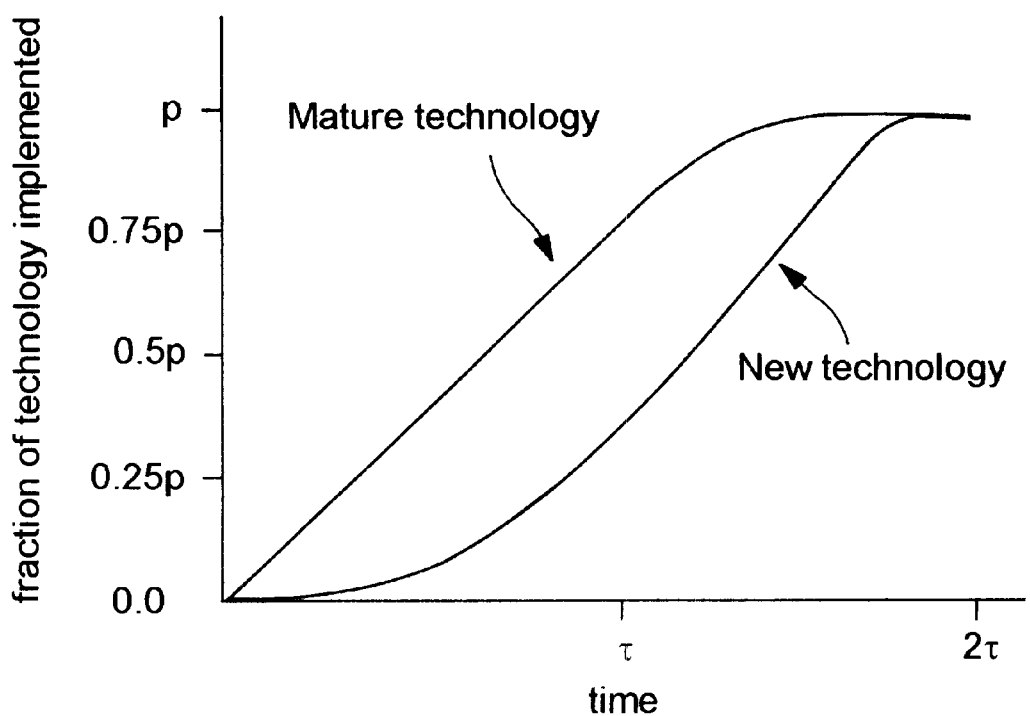
FIG. 9 is a plot comparing the fraction of implemented technology for new and mature technologies over time.

Schematic representations of the two equations are given in FIG. 9.

Figure 10:
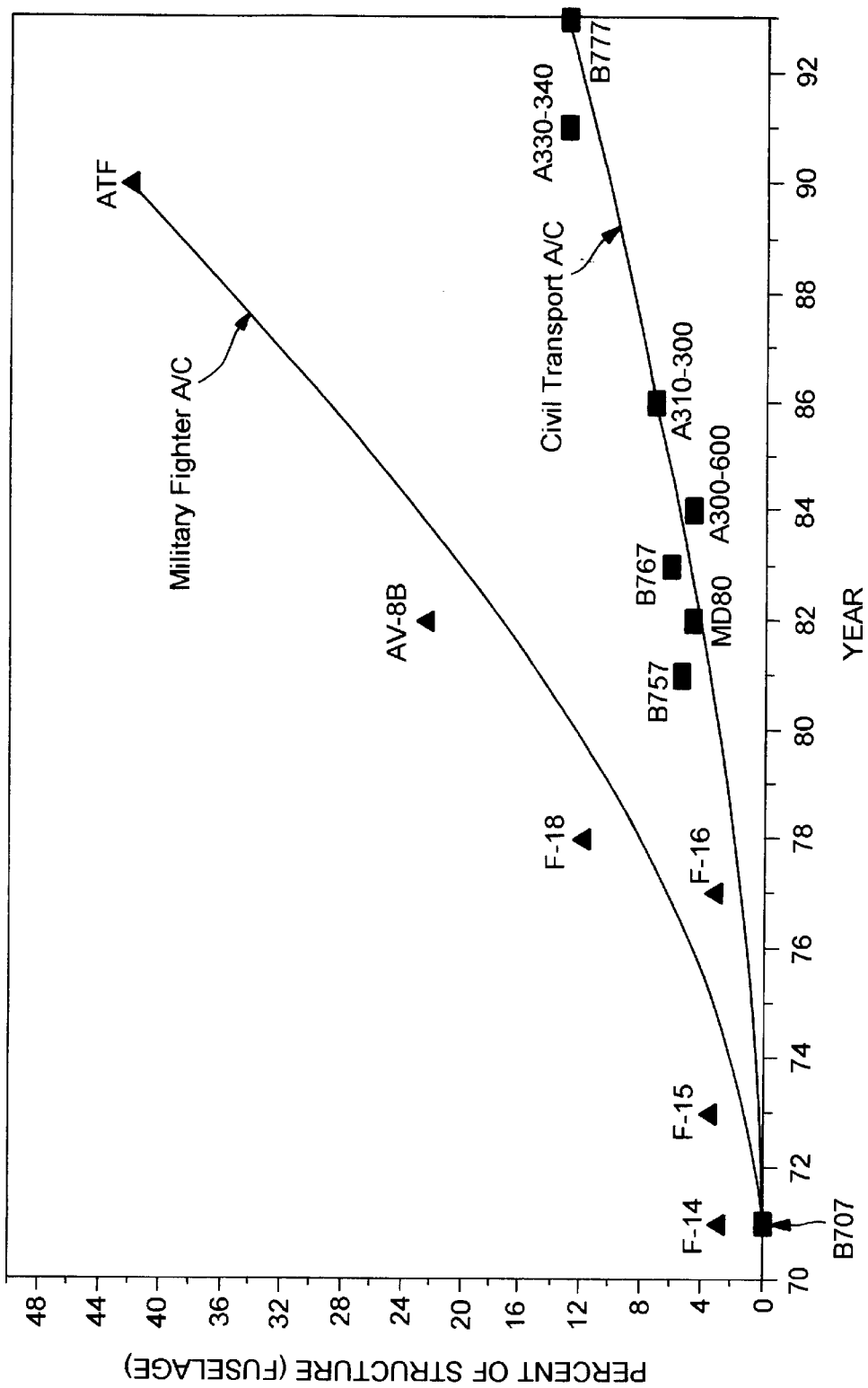
FIG. 10 is a plot of composite material usage in aircraft over time.

To get a feel for the predictive capability of equation (28), the expression for f(t) was used to predict the amount of composites in military and civilian airplanes as a function of time. This comparison is shown in FIG. 10. The data for FIG. 10 is taken from *National Advanced Composites Strategic Plan*, National Center for Advanced Technologies, Washington D.C., pp 32–33, September 1991 and *Jane's All the World's Aircraft* (1996–1997), Butler and Tanner Ltd, London, UK, 1997. For both military and civilian applications in FIG. 10, the amount of composites was taken to be zero in 1970 (t=0). The amount of maximum applicability p and total implementation time 2τ were selected such that the predictions would match the data at one point (ATF and B777 respectively) which was assumed to correspond to t=τ. This is equivalent to assuming that the two data points for ATF and B777 correspond to the maximum rate of implementation of composites. This is considered reasonable given the slow-down in the implementation of composites that followed.

The two curves in FIG. 10 generated from equation (28) (new technology) seem to track the actual composite content reasonably well. Considering the multitude of factors (other than technology-readiness) that affect the amount of composites on an application and the fact that only one data point was used to determine the equation parameters, the predictive capability of equation (28) is considered adequate. Such other factors that cannot be predicted nor controlled are political and funding problems for different programs as well as changes in company policies in reaction to market dynamics. The form and accuracy of equation (28) is not crucial here. Any other expression that reasonably predicts how much of a certain structure can be made by a certain technology would be acceptable. The advantage of equation (28) is that by changing two parameters (p,τ) that reflect an overall perception of technology and factory capabilities, predictions for various technologies and applications can be generated for use in trade studies.

Determination of Alternate Implementation Scenarios

Once a set of candidate technologies has been selected, the optimum technology mix is determined following the procedures outlined above. This mix becomes the target at some future time. The objective here is to generate technology implementation scenarios that will lead to the optimum mix as quickly as possible while keeping the non-recurring cost low.

The technology implementation is constrained by the applicability function f(t) that describes the maximum portion of a part family (by weight) that can be made by a technology at any given time. For this study, the time units were selected to be years. Equations (28) and (29) were used to determine the maximum fraction f of a part family that can be made by a given technology at a given time for a period of up to 10 years.

The optimum technology mix determined above was used as the target. It is summarized in Table 10 below where the numbers are weight fractions of the part family to be made by the corresponding technology. Over the entire fuselage the target mix is as follows: SMT: 0.01, HLP: 0.07, HSM: 0.21, AFP: 0.15, RTM: 0.0, PLT: 0.01, ALP: 0.36. These values do not add to 1 because of the miscellaneous part family that includes windows, seals, etc.

The optimum mix in Table 10 has a 50% probability that the recurring cost savings (over the baseline) will be below 21.9% and a 1% probability that it will be below 13.3%. The corresponding variance is 0.00114.

TABLE 10

Optimum Technology Mix (target)
(e.g. 0.16 Implies 16% of the Part Family
by Weight is Made by the Technology)

|  | SMT | HLP | HSM | AFP | RTM | PLT | ALP |
|---|---|---|---|---|---|---|---|
| Skins & Covers | 0.0 | 0.0 | 0.0 | 0.16 | 0.0 | 0.0 | 0.84 |
| Frames, Bkhds, Stringers | 0.0 | 0.0 | 0.76 | 0.0 | 0.02 | 0.0 | 0.22 |
| | 0.0 | 0.0 | 0.0 | 0.0 | 0.0 | 0.72 | 0.28 |
| Fittings | 0.17 | 0.0 | 0.79 | 0.0 | 0.04 | 0.0 | 0.0 |
| Decks & Floors | 0.0 | 0.0 | 0.0 | 0.52 | 0.0 | 0.0 | 0.48 |
| Doors & Fairings | 0.0 | 0.38 | 0.0 | 0.34 | 0.0 | 0.0 | 0.28 |

The maximum applicability determined by equations (28) and (29) are given in Table 11. The values of 2τ and p used and the type of technology (new or mature) are given in the last three rows of the table. Part families not shown under a certain technology (for example AFP fittings) are not considered to be economically feasible. The maximum applicability for SMT and HLP is assumed to be 1.0 for all part families and times (i.e. these two technologies can be used to manufacture the entire part families today).

Note that for new technologies in Table 11 (last seven columns), the value of p may be larger than 1.0. This is an artifact imposed by the expectation that the implementation of the PLT and ALP technologies would stop when the rate of implementation reached its highest value. That is, no additional implementation is done when the implementation rate starts decreasing to zero from its maximum value as the part complexity increases. In effect, this is equivalent to assuming that these two technologies will not be applied to parts of very high complexity. Thus, the rate of implementation will increase from zero to a maximum at which point the technology implementation will stop.

It is now required to determine the technology implementation plan as a function of time. This must be done using the optimum technology mix of Table 10 as the target and ensuring that the constraints imposed for each year by the maximum applicabilities of the technologies are not violated. This means that at any given year, the technology implemented should be as close to the target value given in Table 10 but should not be any higher than the maximum applicability for that year as given in Table 11.

For each possible scenario, the non-recurring cost (in dollars) and the recurring cost savings (as a percentage of the fuselage cost) are determined as the implementation proceeds from one year to the next. The non-recurring cost is determined using equation (25) and the information in Tables 5 and 9. The recurring cost savings is calculated as discussed above and using Tables 6 and 7.

Following the discussion on alternatives in the section on the time dependent implementation plan above, two possible scenarios are examined in detail. The first, is the lowest non-recurring cost scenario. The second is the maximum yearly cost savings scenario. These are discussed below.

Lowest Non-recurring Cost Scenario

In this case, only technologies present in the optimum mix (Table 10) are used. At the end of each year, the amount implemented for each of these technologies equals the maximum applicability for that year. The resulting implementation is given in Table 12. Following the procedure in reference discussed above, the 50th and 99th percentile curves for cost savings as a function of time are determined and shown in FIG. 11.

Maximum Yearly (Recurring Cost) Savings Scenario

This scenario is determined by applying the optimization approach discussed above on a year by year basis. In contrast to the lowest non-recurring cost scenario where only technologies present in the target technology mix are used, all technologies are allowed here. This means that at intermediate years, where the maximum applicability for a technology may be low, another technology is used (instead of the baseline) which increases the savings. As the target mix is approached, these technologies are phased out. This means that the non-recurring cost will be higher than the lowest recurring cost scenario since money is invested in tooling and technology development for making parts in intermediate years that eventually are switched to another technology once the maximum applicability permits it.

The optimum mix at the end of each year is determined so that the cost savings is maximized with a 99% probability that the cost savings will be lower than the calculated value. For each year, the technologies are not allowed to exceed their respective maximum applicabilities. The software code for determining the optimum mix was modified to have maximum applicabilities less than 1. The 50th and 99th percentile cost savings curves for this scenario are given in FIG. 11 as a function of time.

TABLE 11

Maximum Technology Applicability by Year

| | HSM | | | AFP | | | | RTM | | | | | PLT | | ALP | | | | |
|---|---|---|---|---|---|---|---|---|---|---|---|---|---|---|---|---|---|---|---|
| Yr | skin | frm | ftg | skin | frm | deck | door | skin | frm | strg | deck | door | skin | strg | skin | frm | strg | deck | door |
| 1 | .11 | .5 | .31 | .31 | .10 | .16 | .10 | 1.0 | 1.0 | 1.0 | 0.5 | 0.5 | .01 | .13 | .03 | .02 | .01 | .02 | .01 |
| 2 | .22 | .87 | .59 | .59 | .19 | .31 | .19 | 1.0 | 1.0 | 1.0 | 0.5 | 0.5 | .02 | .50 | .10 | .07 | .05 | .08 | .06 |
| 3 | .32 | 1.0 | .81 | .81 | .28 | .44 | .28 | 1.0 | 1.0 | 1.0 | 0.5 | 0.5 | .05 | 1.0 | .22 | .15 | .11 | .18 | .13 |
| 4 | .41 | 1.0 | .95 | .95 | .35 | .57 | .35 | 1.0 | 1.0 | 1.0 | 0.5 | 0.5 | .09 | 1.0 | .38 | .26 | .19 | .30 | .23 |
| 5 | .49 | 1.0 | 1.0 | 1.0 | .42 | .66 | .42 | 1.0 | 1.0 | 1.0 | 0.5 | 0.5 | .15 | 1.0 | .57 | .40 | .28 | .45 | .34 |
| 6 | .57 | 1.0 | 1.0 | 1.0 | .46 | .74 | .46 | 1.0 | 1.0 | 1.0 | 0.5 | 0.5 | .21 | 1.0 | .78 | .54 | .39 | .62 | .47 |
| 7 | .62 | 1.0 | 1.0 | 1.0 | .49 | .78 | .49 | 1.0 | 1.0 | 1.0 | 0.5 | 0.5 | .27 | 1.0 | 1.0 | .70 | .50 | .80 | .60 |
| 8 | .67 | 1.0 | 1.0 | 1.0 | .50 | .80 | .50 | 1.0 | 1.0 | 1.0 | 0.5 | 0.5 | .34 | 1.0 | 1.0 | .70 | 0.5 | .80 | .60 |
| 9 | .69 | 1.0 | 1.0 | 1.0 | .50 | .80 | .50 | 1.0 | 1.0 | 1.0 | 0.5 | 0.5 | .42 | 1.0 | 1.0 | .70 | 0.5 | .80 | .60 |
| 10 | .70 | 1.0 | 1.0 | 1.0 | .50 | .80 | .50 | 1.0 | 1.0 | 1.0 | 0.5 | 0.5 | .50 | 1.0 | 1.0 | .70 | 0.5 | .80 | .60 |
| $2\tau$ | 10 | 3 | 5 | 5 | 8 | 8 | 8 | 0.0 | 0.0 | 0.0 | 0.0 | 0.0 | 20 | 6 | 14 | 14 | 14 | 14 | 14 |
| P | .70 | 1.0 | 1.0 | 1.0 | .50 | .8 | .50 | 1.0 | 1.0 | 1.0 | 0.5 | 0.5 | 1.0 | 2.0[#] | 2.0[#] | 1.4[#] | 1.0 | 1.6[#] | 1.2[#] |
| N/m* | m | m | m | m | m | m | m | m | m | m | m | m | n | n | n | n | n | n | n |

*n = new technology;
m = mature technology
[#]p > 1 in order for equation (29) to simulate the fact that technology implementation stops when the maximum implementation rate (df/dt) is reached

TABLE 12

Technology Mixes and Required Investments by Year for Each Scenario

| | Scenario 1: Lowest non-recurring cost | | Scenario 2: Maximum yearly savings | |
|---|---|---|---|---|
| Yr | Technology mix (% of entire fuselage) | Investment ($M) | Technology mix (% of entire fuselage) | Investment ($M) |
| 1 | SMT:53, HLP:7, HSM:13, AFP:7, RTM:0, PLT:0, ALP:2 | 12.5 | SMT:11, HLP:31, HSM:16, AFP:11, RTM:12, ALP:1 | 29.1 |
| 2 | SMT:37, HLP:7,HSM:21, AFP:10, RTM:0, PLT:1, ALP:6 | 8.9 | SMT:8, HLP:23, HSM:24, AFP:15, RTM:5, PLT:1, ALP:5 | 11.7 |
| 3 | SMT:26, HLP:7, HSM:21, AFP:13, RTM:0, PLT:1, ALP:13 | 9.1 | SMT:5, HLP:16, HSM:21, AFP:23, RTM:3, PLT:2, ALP:11 | 10.5 |
| 4 | SMT:15, HLP:7, HSM:21, AFP:15, RTM:0, PLT:1, ALP:22 | 6.9 | SMT:2, HLP:11, HSM:22, AFP:24, RTM:0, PLT:1, ALP:22 | 7.8 |
| 5 | SMT:8, HLP:7, HSM:21, AFP:15, RTM:0, PLT:1, ALP:29 | 5.2 | SMT:2, HLP:11, HSM:22, AFP:19, RTM:3, PLT:1, ALP:23 | 2.9 |
| 8 | SMT:1, HLP:7, HSM:21, AFP:15, RTM:0, PLT:1, ALP:36 | 5.0 | SMT:0, HLP:6, HSM:22, AFP:14, RTM:0, PLT:1, ALP:39 | 11.1 |

Comparison of Two Scenarios

Figure 11:
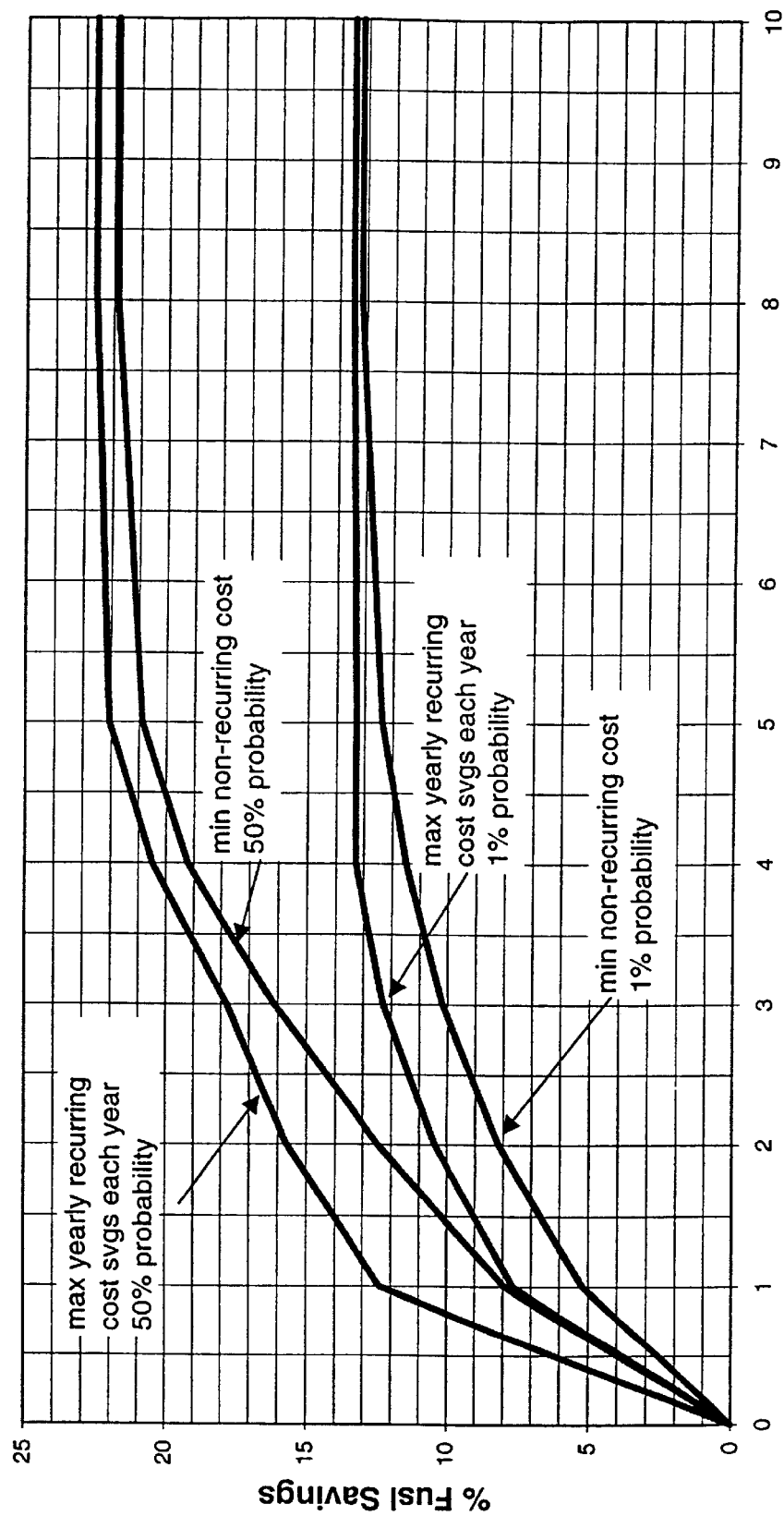
FIG. 11 is a plot of curves of cost savings over time associated with a different levels of probability.

The non-recurring cost in switching from the technology mix from one year to the next is given in Table 12. The 99th percentile cost savings curves from FIG. 11 are repeated in FIG. 12 along with the required investments from Table 12. From Table 12, the total investment for scenario 1 is $47.6M while for scenario 2 is $73.1M.

In reviewing Table 12, several comments are in order. First, the technology breakdowns by part family are available but are not included here for conciseness. Only the overall percentages for the entire fuselage are shown in Table 12. Note that the technology mix after 8 years is identical to the target mix for scenario 1 and quite close for scenario 2. The differences are due to small discrepancies in the variance values used with the optimization code.

Second, the non-recurring cost includes the process development cost of $6.5M divided evenly over the first three years of the implementation. The process development cost is the sum of the data in column 2 of Table 9 since all technologies are used in year 1 of both scenarios.

Third, scenario 2 requires the use of technologies such as HLP and RTM over the first couple of years at percentages much higher than those required by the optimum mix. This is done because the technologies with the highest savings, HSM, AFP, and ALP have low maximum applicabilities for these years. In subsequent years, the applicabilities increase as the technologies become mature and the amount of HLP and RTM decrease. However, the non-recurring cost associated with the increased amounts over the target mix becomes a sunk cost (tooling for HLP and RTM may not be used once parts are switched to HSM, AFP, and ALP).

Figure 12:
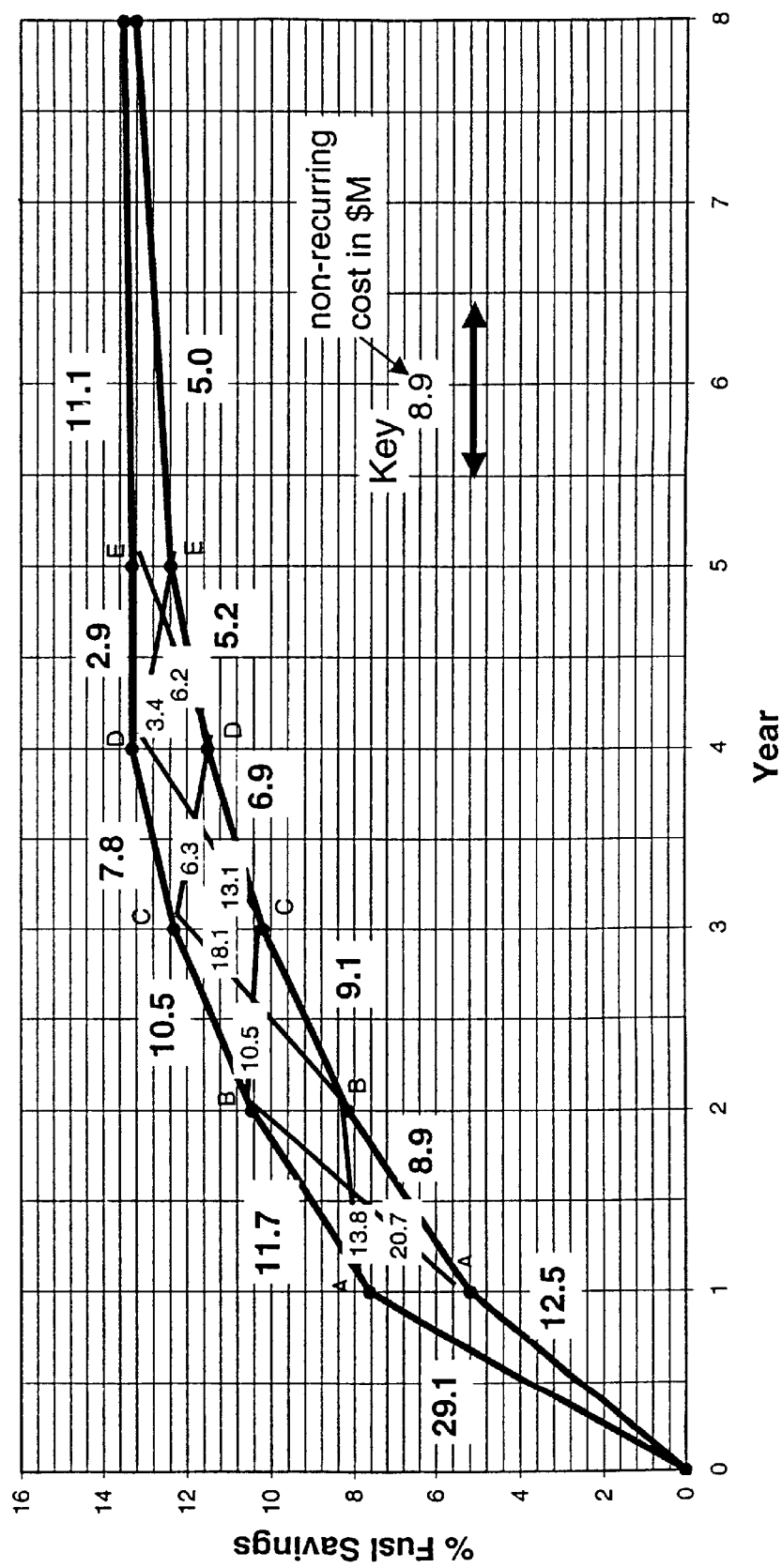
FIG. 12 is a plot illustrating technology implementation scenarios as a function of time and non-recurring cost.

As is seen from FIG. 12 and Table 12, scenario 2, maximum recurring cost savings per year, yields significantly higher savings per year but requires a much higher investment. The increased savings per year gives a competitive advantage since some (or all) may be passed to the customer as a lower price which could increase market share or help maintain it. The market share will depend on whether competitors are offering similar price reductions at the same time. Conversely, if the market share is secure, most (or all) of the cost savings can become profit by keeping the same price for the product.

Another important feature evident in FIG. 12 is that most of the technology implementation is done in 4 years (for scenario 2) or 5 years (for scenario 1). As a result, one may elect to stop implementation after the 4th year for scenario 2 and the 5th year for scenario 1 and save $14M and $5M of investment, respectively. Therefore, the investments required would be $59.1 M (up to point D2 in FIG. 12) for scenario 2, and $42.6M (up to point E1 in FIG. 12) for scenario 1.

It is also important to note that there seems to be no easy way to speed up the implementation further. There are two reasons for this: First, the investment required, even for scenario 1 which has lower investment, may be prohibitive to be spread over fewer than 4 years. For example, for scenario 1, the investment for 5 years spread over three years would average $14.2M per year. For scenario 2, the investment for 4 years spread over three years would average $19.7M. Second, the maximum applicabilities for the various technologies would have to change from those in Table 11. Higher applicabilities in the first few years would allow faster implementation. This, however, increases risk significantly as, for some technologies (especially new ones such as ALP) application of a technology to a wider range of parts may lead to producibility or structural integrity problems. In fact, in some cases, increased applicabilities may not be achievable.

The flexibility to switch from one scenario to another is also of paramount importance. A hybrid scenario is envisioned where implementation starts following scenario 1 which has lower cost and switches to scenario 2 which has higher savings after a few years. The investment levels required to switch from one scenario to another at various times during the implementation are also shown in FIG. 12. They were calculated using equation (25).

Two more scenarios become quite attractive now. One is the technology implementation such that point D2 (highest recurring cost savings in the long run) is reached with the lowest possible investment. This is the exact same problem discussed earlier. By applying the stagecoach problem solution, the path with the lowest non-recurring cost is found. It is OA1B1C1D2 with a total investment of $43.6M.

The other option is to try to combine some of the recurring cost savings with the low investment. This is done by starting with scenario 1 which has much lower investment than scenario 2 at the beginning and then switch to scenario 2. Such a path is OA1B2C2D2 with a total investment of $51.5M. This path has higher cost savings for all years except for the first and a total investment that is $7.6M less than the investment of $59.1M calculated earlier (up to point D2).

In summary, the four most attractive options are shown in Table. 13:

TABLE 13

Options for Generic Fuselage Example

| Scenario | Investment ($M) | Recurring cost savings (% of fuselage cost) | Comment |
|---|---|---|---|
| 1 (OA1B1C1D1E1) | 42.6 | 12.4 | Lowest investment |
| 2 (OA2B2C2D2) | 59.1 | 13.3 | Highest investment, highest savings |
| 3 (OA1B1C1D2) | 43.6 | 13.3 | Lowest investment to get to D2 |
| 4 (OA1B2C2D2) | 51.5 | 13.3 | Highest svgs except yr 1, medium investment |

As is apparent, the scenario to be selected is a matter of management strategic goals, market perceptions, cash availability for investment, the presence of a strong research and development program that can quickly bring new technologies to production readiness, etc. Each of the four options just presented has advantages and disadvantages. It should be pointed out that the cost savings values are all with a 99% probability of higher savings so all paths have the same amount of risk from a recurring cost point of view.

The present invention provides an approach to develop the optimum technology mix and implementation scenarios as a function of time for fabricating a helicopter fuselage. The present analysis can readily be applied to other areas with equal success.

Figure 13:
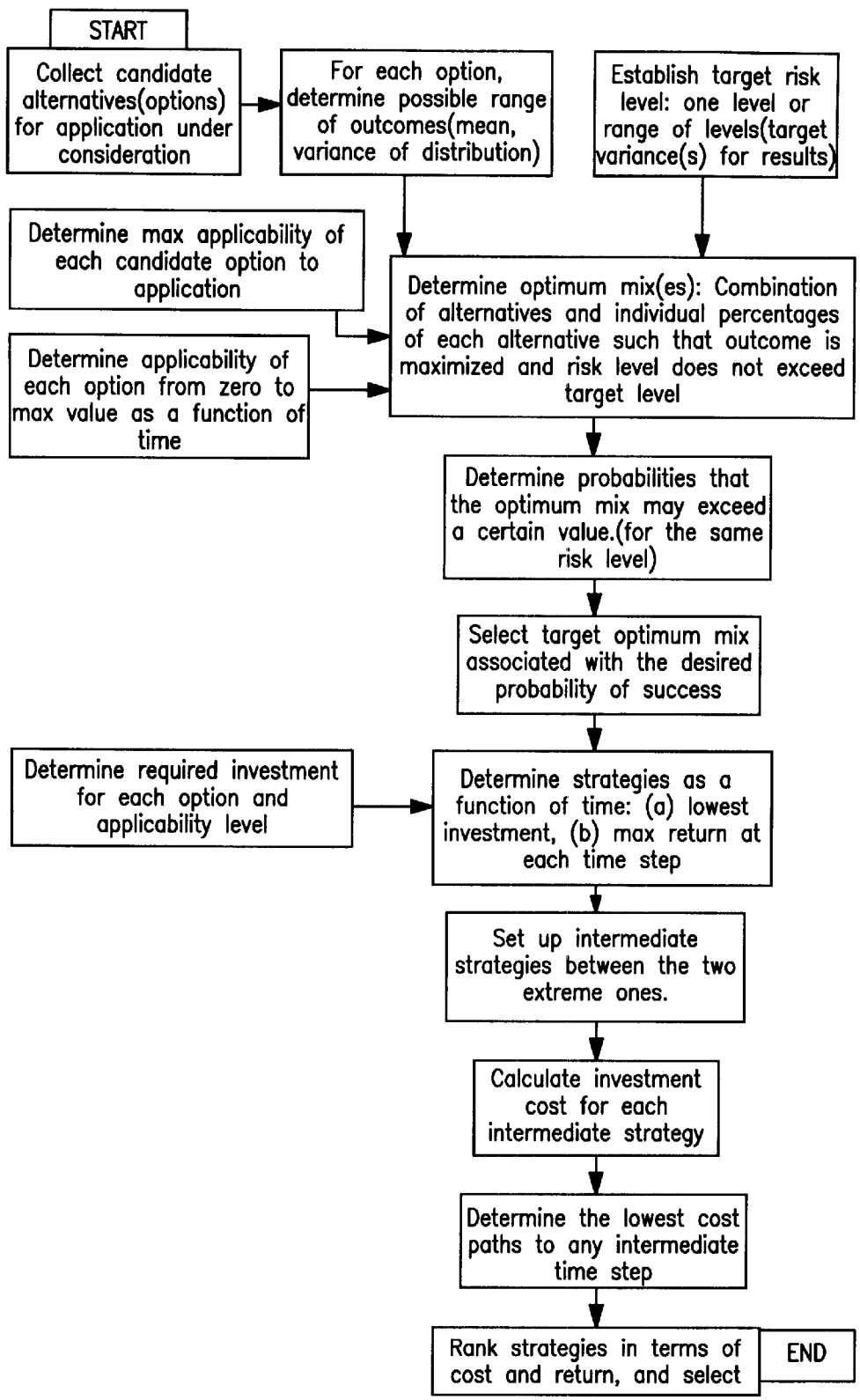
FIG. 13 is a flow chart of the present invention for use in determining the optimum use of resources.
Figure 14:
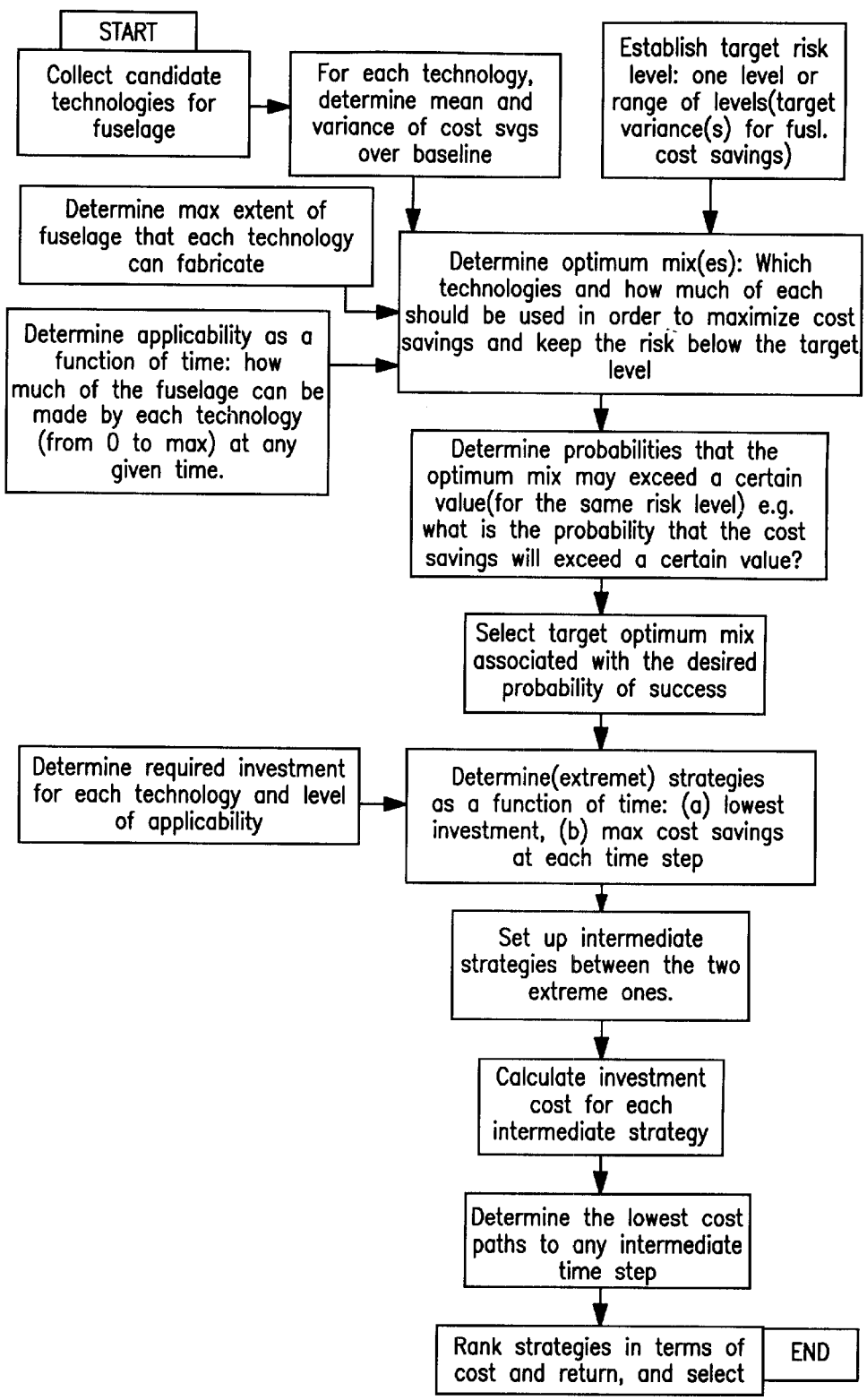
FIG. 14 is a flow chart of the present invention for use in determining the optimum use of manufacturing technologies for fabricating a helicopter fuselage.

FIGS. 13 and 14 illustrate flow charts which provide an overview of the analysis. The flowchart in FIG. 13 is generally applicable to achieving any desired task with predetermined resources. The flowchart of FIG. 14 relates to the application of the present invention to a generic helicopter.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A method of determining the optimum mixture of resources for achieving an outcome while maintaining the risk associated with achieving the outcome below a threshold, the method comprising the steps of:
   selecting a plurality of resources which can be used to achieve a desired outcome;
   determining an associated outcome for each resource;
   establishing at least one target risk level for the desired outcome;
   calculating an associated outcome and risk for a plurality of combinations of the resources at a plurality of percentage applications of each resource; and
   determining an optimum mix of resources and percentage of application of each resource which maximizes the outcome while maintaining the risk below the at least one target risk level.

2. The method of claim 1 wherein the step of determining the associated outcome for each resource involves determining a mean and variance of distribution for the associated outcome.

3. The method of claim 1 further comprising the step of determining the maximum applicability of each resource, and wherein the step of determining the optimum mix of resources also involves maintaining use of each resource in the mix below the maximum applicability of that resource.

4. The method of claim 3 further comprising the step of determining the applicability of each resource from zero to its associated maximum applicability as a function of time.

5. The method of claim 1 further comprising the step of determining a range of probabilities that the outcome associated with the optimum mix will exceed a predetermined value for the same risk level.

6. The method of claim 5 further comprising the step of selecting a target optimum mix for a desired probability.

7. The method of claim 1 further comprising the steps of:
   determining the required investment associated with using each resource and the applicability level of the resource as a function of time; and
   determining the mix of resources which results in the lowest overall investment, and the mix of resources which results in the maximum outcome for each time period.

8. The method of claim 7 wherein the mix of resources which results in the maximum outcome for each time period is the mix which results in the maximum cost savings for the time period.

9. The method of claim 7 further comprising the steps of:
   determining intermediate strategies between lowest investment strategy and the maximum outcome for each time period;
   calculating an investment cost for each intermediate strategy;
   determining the lowest cost to achieve an intermediate strategy;
   ranking of strategies as a function of investment and associated outcome; and
   selecting the desired strategy.

10. The method of claim 1 wherein the resources selected are manufacturing technologies for fabricating a helicopter fuselage and wherein the associated outcome is a cost savings associated with fabricating a portion of the helicopter fuselage using the manufacturing technology, and wherein the step of determining the associated cost savings for each manufacturing technology involves determining a mean and variance of cost savings over a baseline.

11. The method of claim 10 further comprising the step of determining the maximum applicability of each manufacturing technology, and wherein the step of determining the optimum mix of resources involves determining the optimum mix of manufacturing technologies to achieve the maximum cost savings while maintaining the risk associated with that optimum mix below the target level, and wherein the amount that each technology is used in the optimum mix is below the maximum applicability for that manufacturing technology.

12. A method of determining the optimum mixture of manufacturing technologies for fabricating at least one component of an aircraft which achieves a desirable cost savings at a desirable level of risk, the method comprising the steps of:
   selecting a plurality of manufacturing technologies which are capable of producing the at least one component;
   determining a cost associated with manufacturing the at least one component using each manufacturing technology;
   establishing at least one target risk level for the component cost savings;
   calculating an associated cost savings and risk for a plurality of combinations of manufacturing technologies and for varying amounts of application of each manufacturing technology; and
   determining an optimum mix of manufacturing technologies and amount that each manufacturing technology is used which maximizes the cost savings while maintaining the risk below the at least one target risk level.

13. The method of claim 12 wherein the step of determining the cost associated with manufacturing the at least one component using each manufacturing technology involves determining a mean and variance of cost savings over a baseline.

14. The method of claim 12 further comprising the step of determining the maximum amount of the at least one component that each technology can fabricate, and wherein the step of determining the optimum mix of manufacturing technologies involves maintaining use of each manufacturing technology in the mix below the maximum amount for that manufacturing technology.

15. The method of claim 14 further comprising the step of determining the applicability of each manufacturing technology from zero to its associated maximum applicability as a function of time.

16. The method of claim 12 further comprising the step of determining a range of probabilities that the cost savings associated with the optimum mix will exceed a set value.

17. The method of claim 16 further comprising the step of selecting a target optimum mix for a desired probability.

18. The method of claim 12 further comprising the steps of:
  determining the required investment associated with using each manufacturing technology and the applicability level of the manufacturing technology as a function of time; and
  determining the mix of manufacturing technologies which results in the lowest overall investment, and the mix of manufacturing technologies which results in the maximum cost savings for each time period.

19. The method of claim 18 further comprising the steps of:
  determining intermediate strategies for a series of time periods between lowest investment strategy and the maximum cost savings;
  calculating an investment cost for each intermediate strategy at each time period;
  determining the lowest cost to any intermediate strategy for each time period;
  ranking of strategies as a function of investment and cost savings; and
  selecting the desired strategy.

20. The method of claim 12 wherein the at least one component is a plurality of components and wherein the step of calculating an associated cost savings and risk is according to the following formula $$C_s^{(i)} = \sum_{j=1}^{N} x_{ij} s_{ij} \quad (i = 1, \ldots M)$$

subject to:

$$\sum_{j=1}^{N} x_{ij}^2 \sigma_{ij}^2 \leq \alpha^2, \quad (i = 1, \ldots M)$$

$$0 \leq x_{ij} \leq 1$$

$$\sum_{j=1}^{N} x_{ij} = 1, \quad (i = 1, 2, \ldots M), \quad \text{and} \quad \alpha^2 = v \bigg/ \sum_{i=1}^{M} d_i^2$$

where i denotes the associated component, j denoted the manufacturing technology associated with producing component i, $s_{ij}$ denotes the mean of the cost savings realized by applying the manufacturing technology j to the component i, $x_{ij}$ denotes the percentage of component i that is manufactured using technology j, N is the total number of manufacturing technologies that are being considered to produce each component i, M is the total number of components, v is the target variance, $\alpha^2$ denotes the cost savings variance for all components, $\sigma_{ij}^2$ denotes the variance of cost savings realized by applying technology j to component i, and $d_i$ is the cost fraction of the entire aircraft that component i accounts for.

21. The method of claim 20 wherein the step of determining the optimum mix of manufacturing technologies and amount of each manufacturing technology is according to the following formula $$C_s = \sum_{i=1}^{M} d_i \sum_{j=1}^{N} x_{ij} s_{ij}$$

where $C_s$ is the cost savings and is maximized subject to the following equations $$\sum_{i=1}^{M} d_i^2 \sum_{j=1}^{N} x_{ij}^2 s_{ij}^2 \leq v$$

$$0 \leq x_{ij} \leq 1,$$

and $$\sum_{j=1}^{N} x_{ij} = 1, \quad (i = 1, \ldots M).$$

22. A method of determining the optimum mixture of resources for achieving a maximum outcome while maintaining the risk associated with achieving the outcome below a threshold, the method comprising the steps of:
  selecting a plurality of resources which can be used to achieve the desired outcome;
  determining an associated mean and variance of distribution for each manufacturing technology;
  establishing at least one target risk level for the outcome;
  determining the maximum applicability of each resource as a function of time;
  calculating an associated outcome and risk for a plurality of resource mixes and for varying amounts of usage for each resource;
  determining an optimum mix of resources with an associated amount that each resource is used in the mix, where the optimum mix maximizes the outcome while maintaining the risk associated with the mix below the at least one target risk level and maintaining use of each resource in the mix below the maximum applicability of that resource;
  determining a range of probabilities that the outcome associated with the optimum mix will exceed a predetermined value for the at least one target risk level;
  selecting a target optimum mix based on a desired probability;
  determining the required investment associated with using each resource and the applicability level of the resource as a function of time;
  determining the mix of resources which results in the lowest overall investment, and the mix of resources which results in the maximum outcome for each time period;
  determining intermediate resource mixes between the resource mix generating the lowest investment and the resource mix generating the maximum outcome;
  calculating an investment cost for each intermediate resource mix;
  determining the lowest cost to achieve an intermediate resource mix;

ranking the resource mixes as a function of investment and outcome; and selecting a desired resource mix.

23. The method of claim 22 wherein the resources selected are manufacturing technologies for fabricating a portion of a helicopter fuselage and wherein the associated outcome is a cost savings associated with fabricating the portion of the helicopter fuselage using the manufacturing technology, and wherein the step of determining the associated cost savings for each manufacturing technology involves determining a mean and variance of cost savings over a baseline.

* * * * *